United States Patent
Caswell et al.

(10) Patent No.: US 6,336,138 B1
(45) Date of Patent: Jan. 1, 2002

(54) TEMPLATE-DRIVEN APPROACH FOR GENERATING MODELS ON NETWORK SERVICES

(75) Inventors: Deborah L. Caswell, Santa Clara; Srinivas Ramanathan, Sunnyvale, both of CA (US); James D. Hunter, Fort Collins, CO (US); Scott S. Neal, Fort Collins, CO (US); Frederick A. Sieker, Fort Collins, CO (US); Mark D. Smith, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/139,959

(22) Filed: Aug. 25, 1998

(51) Int. Cl.[7] ............................. G06F 15/173; G06F 15/15
(52) U.S. Cl. ...................... 709/223; 709/224; 709/226; 345/440; 370/229
(58) Field of Search ............................ 709/224, 223, 709/225, 226, 245, 218; 345/440, 449; 370/229, 254

(56) References Cited

U.S. PATENT DOCUMENTS

| | | | |
|---|---|---|---|
| 5,185,860 A | | 2/1993 | Wu ............................. 395/200 |
| 5,276,789 A | | 1/1994 | Besaw et al. ................ 395/140 |
| 5,455,853 A | * | 10/1995 | Cebulka et al. ............. 379/201 |
| 5,778,049 A | * | 7/1998 | Young et al. .................. 379/10 |
| 5,796,951 A | * | 8/1998 | Hamner et al. ............. 709/223 |
| 6,076,106 A | * | 6/2000 | Hamner et al. ............. 709/223 |
| 6,138,122 A | * | 10/2000 | Smith et al. ................. 707/103 |
| 6,182,136 B1 | * | 1/2001 | Ramanathan et al. ....... 709/224 |

* cited by examiner

Primary Examiner—Glenton B. Burgess
Assistant Examiner—Abdullahi E. Salad

(57) ABSTRACT

A method and system of modeling a selected service within a network environment includes forming a service model template that is not specific to the network environment, but identifies anticipated network elements and network services that cooperate to enable the selected service. The service model template includes specifications related to linking the anticipated network elements and network services. When the service model template is combined with discovered instance information that is specific to actual network elements and actual network services, a service model instance is generated for the selected service. The service model instance includes identifications of dependencies among the elements and services. Preferably, the service model instance also includes identification of the "health" of the different elements and services. A view generator may be used to configure the service model instance as a hierarchical graph of nodes that are linked to identify the dependencies among the nodes. The discovered instance information may be acquired using a discovery template that orchestrates the process. The discovery template may identify auto-discovery modules that are to be used to detect actual network elements and services and may identify dependencies among the modules. A user-configurable discovery engine accesses the discovery template and deploys the modules in order to acquire the discovered instance information.

15 Claims, 12 Drawing Sheets

TEMPLATE-DRIVEN APPROACH FOR GENERATING MODELS ON NETWORK SERVICES

TECHNICAL FIELD

The invention relates generally to methods and systems for linking components of a service available via a network to assess the health of the service and to diagnose problems associated with the service. More particularly, the invention relates to methods and systems for generating a hierarchical structure of a network service.

BACKGROUND ART

Originally, computer networks were designed to have a centralized network topology. In such a topology, a centralized mainframe computer is accessed by users at computer terminals via network connections. Applications and data are stored at the mainframe computer, but may be accessed by different users. However, a current trend in network design is to provide a topology that enables distributed processing and peer-to-peer communications. Under this topology, network processing power is distributed among a number of network sites that communicate on a peer-to-peer level. Often, there are a number of servers within the network and each server is accessible by a number of clients. Each server may be dedicated to a particular service, but this is not critical. Servers may communicate with one another in providing a service to a client.

Networks vary significantly in scope. A local area network (LAN) is limited to network connectivity among computers that are in close proximity, typically less than one mile. A metropolitan area network (MAN) provides regional connectivity, such as within a major metropolitan area. A wide area network (WAN) links computers located in different geographical areas, such as the computers of a corporation having business campuses in a number of different cities. A global area network (GAN) provides connectivity among computers in various nations. The most popular GAN is the network commonly referred to as the Internet.

The decentralization of computer networks has increased the complexity of tracking network topology. The network components (i.e., "nodes") may be linked in any one of a variety of schemes. The nodes may include servers, hubs, routers, bridges, and the hardware for linking the various components. Systems for determining and graphically displaying the topology of a computer network are known. U.S. Pat. No. 5,276,789 to Besaw et al. and U.S. Pat. No. 5,185,860 to Wu, both of which are assigned to the assignee of the present invention, describe such systems. As described in Besaw et al., the system retrieves a list of nodes and their interconnections from a database which can be manually built by a network administrator or automatically constructed using computer software. The system can be configured to provide any one of three views. An internet view shows nodes and interconnections of different networks. A network view shows the nodes and interconnections of a single network within the internet view. A segment view displays nodes connected within one segment of one of the networks. Selected nodes on the network, called discovery agents, can convey knowledge of the existence of other nodes. The network discovery system queries these discovery agents and obtains the information necessary to form a graphical display of the topology. The discovery agents can be periodically queried to determine if nodes have been added to the network. In a Transmission Controller Protocol/Internet Protocol (TCP/IP) network, the discovery agents are nodes that respond to queries for an address translation table which translates Internet Protocol (IP) addresses to physical addresses.

The Besaw et al. and Wu systems operate well for graphically displaying hardware components and hardware connections within a network. From this information, a number of conclusions can be drawn regarding the present capabilities and future needs of the network. However, the interdependencies of the components in providing a particular service are not apparent from the graphical display that is presented by the system. The complexities of such interdependencies continue to increase in all networks, particularly the Internet.

Another approach is described by J. L. Hellerstein in an article entitled "A Comparison of Techniques for Diagnosing Performance Problems in Information Systems: Case Study and Analytic Models," *IBM Technical Report*, September, 1994. Hellerstein proposes a measurement navigation graph (MNG) in which network measurements are represented by nodes and the relationships between the measurements are indicated by directed arcs. The relationships among measurements are used to diagnose problems. However, the approach has limitations, since MNGs only represent relationships among measurements. A user of a system that is based on this approach must understand the details of the measurements (when, where, and how each measurement is performed) and their relationships to the different service elements. This understanding is not readily available using the MNG approach.

The emergence of a variety of new services, such as World Wide Web (WWW) access, electronic commerce, multimedia conferencing, telecommuting, and virtual private network services, has contributed to the growing interest in network-based services. However, the increasing complexity of the services offered by a particular network causes a reduction in the number of experts having the domain knowledge necessary to diagnose and fix problems rapidly. Within the Internet, Internet Service Providers (ISPs) offer their subscribers a number of complex services. An ISP must handle services that involve multiple complex relationships, not only among their service components (e.g., application servers, hosts, and network links), but also within other services. One example is the web service. This service will be described with reference to FIG. 1. Although it may appear to a subscriber of the ISP 10 that the web service is being exclusively provided by a web application server 12, there are various other services and service elements that contribute to the web service. For instance, to access the web server 12, a Domain Name Service (DNS) server 14 is accessed to provide the subscriber with the IP address of the web site. The access route includes one of the Points of Presence (POP) 16, a hub 18, and a router 20. Each POP houses modem banks, telco connections, and terminal servers. A subscriber request is forwarded to and handled by a web server application. The web page or pages being accessed may be stored on a back-end Network File System (NFS) 22, from which it is delivered to the web server on demand. When the subscriber perceives a degradation in the Quality of Service (QoS), the problem may be due to any of the web service components (e.g., the web application server 12, the host machine on which the web application server is executing, or the network links interconnecting the subscriber to the web server), or may be due to the other infrastructure services on which the web service depends (e.g., DNS or NFS). The ISP system 10 of FIG. 1 is also shown to include an authentication server 24 for performing a subscriber authentication service, a mail server 26 for enabling email service (for login and email access), and front-end and back-end servers 28, 30 and 32 for allowing Usenet access.

Subscribers demand that ISPs offer reliable, predictable services. To meet the expectations of subscribers and to attract new subscribers, ISPs must measure and manage the QoS of their service offerings. This requires a variety of tools that monitor and report on service-level metrics, such as availability and performance of the services, and that provide health reports on the individual service components. Unfortunately, the majority of management systems have not kept pace with the service evolution. Available management systems lack the capability to capture and exploit the inter-relationships that exist among services available in a network environment, such as the Internet.

Each network is unique in various respects, such as the con-figuration of servers, the types of application servers, the service offerings, the organizational topology, and the inter-service dependencies. Therefore, in order to accurately understand the operations of the network, specific models must be crafted for the services provided within the network. Regarding an ISP system, handcrafting models of services available via the ISP requires an enormous effort on the part of a human expert or group of experts. Consequently, inter-service dependencies are typically not fully recognized, even by the experts.

What is needed is a method that facilitates construction of a model of a core service available via the network, including inter-service dependencies that are relevant to providing the core service.

SUMMARY OF THE INVENTION

A method and system for modeling a selected service that is available via a network includes utilizing a service model template as a basis for generating a service model instance of the selected service. The service model template anticipates -network elements and network services that cooperate in execution of the selected service. The service model template is specific to the service, but is independent of any particular computing environment. When the template is combined with discovery information that is specific to the actual network elements and the actual network services of a particular computing environment, the service model instance is generated. That is, the service model instance is the realization of the template for a particular set of elements, services and inter-dependencies in a specific computing environment.

The discovered instance information that is specific to the actual network elements and actual network services may be acquired using any of a variety of techniques. However, in the preferred embodiment, the discovered instance information is determined using auto-discovery techniques without requiring human involvement. Moreover, the step of generating the service model instance is preferably executed in computing programming and includes accessing at least one memory store in which the service model template and the discovered instance information are stored.

Also in the preferred embodiment, the service model template includes associations between measurable performance parameters (e.g., availability and delay) and the network elements and network services. The step of generating the service model instance may then include indicating states of various network elements and network services based on the measurements, with the states being indicative of the "healths" of the elements and services. Once generated, a service model instance can be used to support management functions, such as operational monitoring, capacity planning, customer support, and service-level contact management.

While not critical, the method may be utilized to model a service provided by an Intranet or Internet Service Provider (ISP). The service model template may be formed to be substantially generic to ISPs, but the service model instance will be specific to the ISP of interest. Depending on the service being modeled and the network elements that are anticipated to be involved, the service model template defines nodes of various element types (e.g., hosts, servers, network links and services) and their associated measurements. Moreover, the template indicates the dependencies among the nodes, such as the dependency of the selected service on other services (e.g., the Read Mail service depends on the authentication and NFS services). The template preferably also includes default state computation rules for specific nodes, so that the state of a particular node can be based upon measurements associated with the node and upon states of dependencies of the node. In the embodiment in which the discovered instance information is acquired using auto-discovery, the process includes a discovery template. The discovery template identifies particular discovery modules that are invoked to discover elements and services of designated types. The discovery template also identifies each dependency of a discovery module on other discovery modules. Thus, the discovery template is used to orchestrate the process of detecting the network elements and network services that are relevant to the selected service. The discovery template may also be used to format the outputs of the discovery modules.

The system for modeling the selected service includes memory for storing the service model template, a discovery engine for initiating operations specific to identifying the relevant network elements and services, and a model creation engine that maps the discovered network elements and services into a framework identified in the service model template. Preferably, the system includes a view generator that provides a graphical display of the service model instance. The display may be a hierarchical graph of nodes that are inter-linked to indicate inter-dependencies among the nodes. Color coding or other schemes may be used to identify the states of the nodes. The view generator is configurable to enable different views, so that personnel having different domains of interest may focus upon different aspects of the service model instance.

An advantage of the invention is that a service model instance that is tailored to a particular computing environment is generated without requiring complete handcrafting by a highly skilled individual. The customization accounts for differences in the number of services involved in providing a service, geographical locations of services, differences in inter-service dependencies, etc. The use of a service model template renders it easier to modify an existing service model instance. By editing the service model template, an ISP can add a new element type service model instance and cause changes to the attributes of all nodes in the service model instance that represent a specific element. Without a service model template, such changes would be difficult to incorporate and may even require extensive changes to the software that generates a service model instance. Moreover, the task of correlating measurements to deduce root-causes of problems has been simplified. The service model instance encapsulates the knowledge of a human expert by reflecting the dependencies that may exist among services and among network elements. Thus, the service model instance represents the structure of the selected service. By traversing the service model using logic to interpret the state of the different services and elements represented in the model, the root-cause of a problem is easily identified.

BEST MODE FOR CARRYING OUT THE INVENTION

Figure 1:
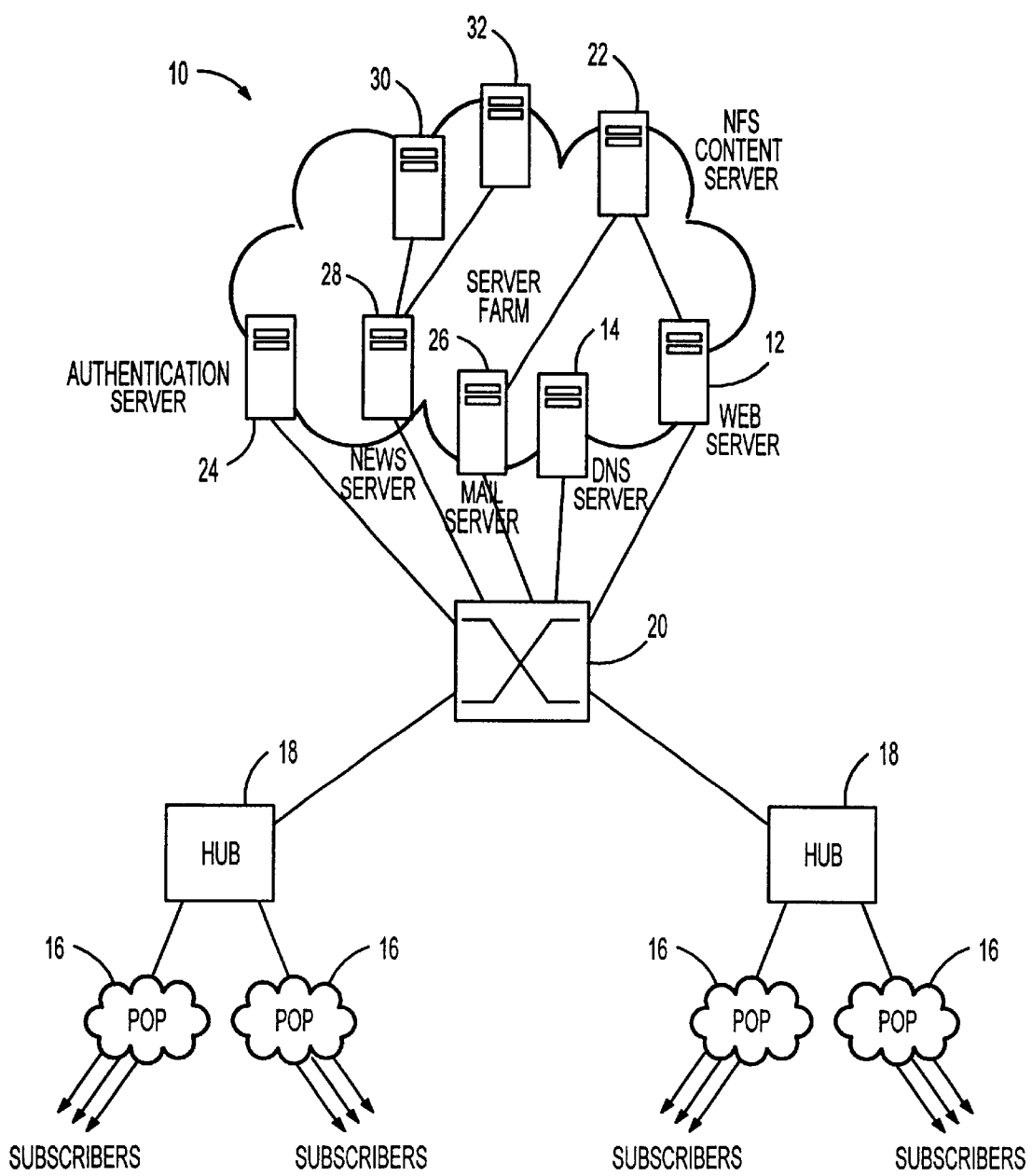
FIG. 1 is a schematic view of an exemplary prior art Internet Service Provider (ISP) system.
Figure 2:
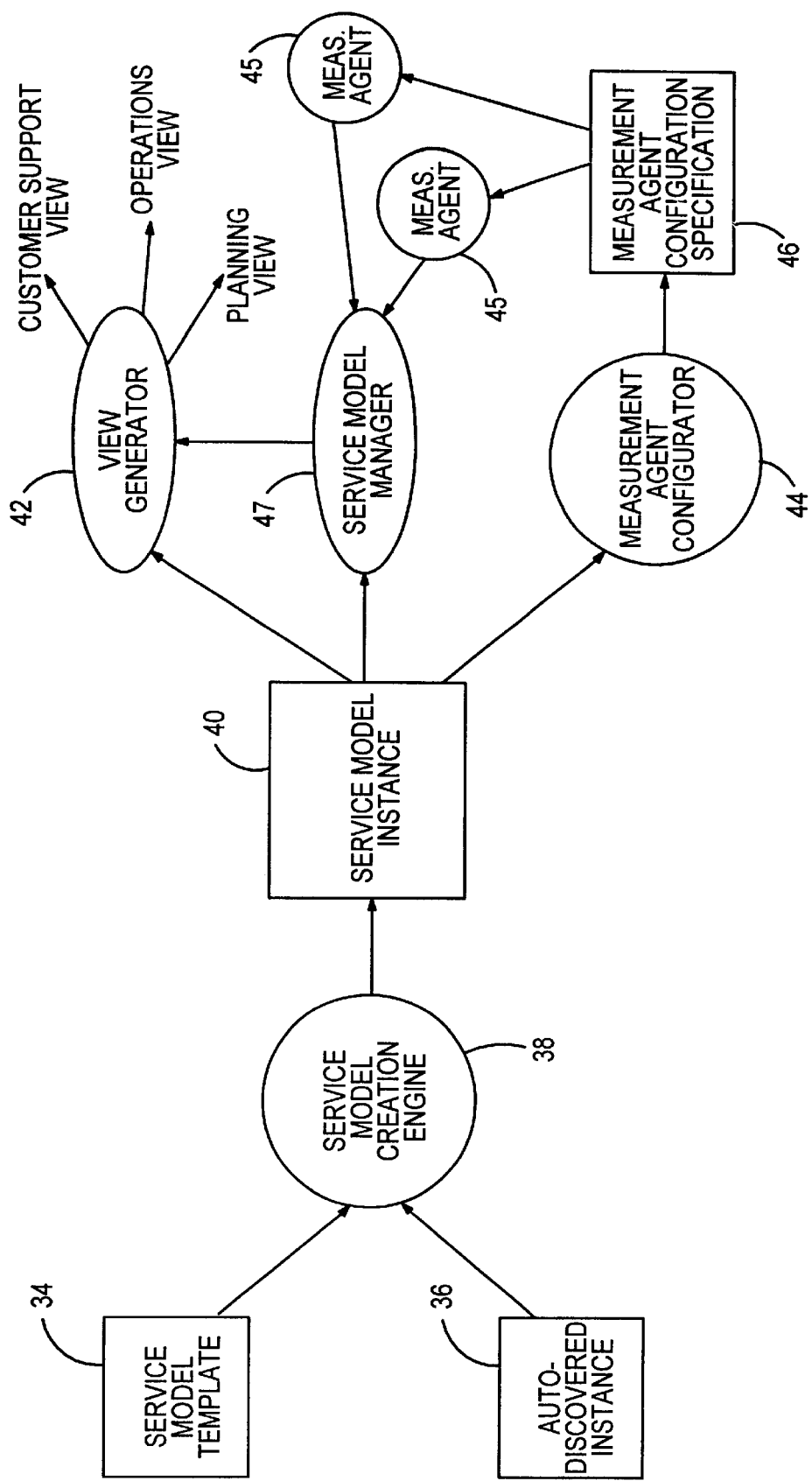
FIG. 2 is a block diagram of components of a system for modeling a selected service available via a network, such as the ISP of FIG. 1.

An overview of a template-driven process for generating a service model for a particular network is illustrated in FIG. 2. While the invention will be described primarily with reference to application to an ISP system, the process has other applications. That is, the process may be used to provide a service model for other providers of services in network environments (e.g., for services within a corporation's network).

A first phase in constructing a service model is the generation of a specification of a service model template 34. The service model template is a generic specification of the service topology and measurement topology for the service of interest (e.g., Read Mail service). Depending on the service being modeled and the service elements that are likely to be involved, the template defines nodes of various types (e.g., hosts, servers, network links, and services) and their associated measurements. Moreover, the template indicates the dependencies among the nodes, such as the dependency of the service on other services (e.g., the Read Mail service which refers to a subscriber accessing his/her mailbox depends on the authentication and NFS services). In the preferred embodiment, the template also includes default state computation rules for specified nodes, so that the state (i.e., "health") of a node can be computed based upon measurements associated with the node and upon states of dependencies of the node.

The service model template 34 is not specific to any ISP system in the sense that it does not specifically reference any hosts, servers, network links, service groups, or other services or service elements in the ISP system. The template may be considered as a "lifeless tree." There is no association between nodes in the service model template and running elements, such as hosts and servers. However, the information contained in the service template for a node may include the element type, the element dependencies, the measurement definitions (e.g., agent to run, the format of the run string, the number and type of parameters, and the format of the output), default state computation rules, default thresholds, default baselines, and default alarm generation and correlation rules.

In database terminology, the service model template 34 is the schema. On the other hand, an instance defines the records in the database and the values of the static information. In FIG. 2, the instance 36 is determined using auto-discovery, as will be explained fully below. Information regarding the services and service elements (e.g., servers, hosts and links) that exist in the ISP system or other service provider systems may be auto-discovered. The store representing auto-discovered information shall be referred to as the auto-discovered instance 36. In one embodiment, the auto-discovery approach is dividable into two phases. In the first phase, the information that is available in the domain name system of an ISP is used to discover the existence and the relationships among different services. In order to allow subscribers to access a host using its host name, rather than requiring specification of an IP address that is more difficult to remember, DNS is used to map the host names to the IP addresses for all hosts in the ISP system. Moreover, the exchange of email messages across hosts also occurs using the mail exchange records (MX records) maintained by the DNS. In summary, the domain name system stores a wealth of information that is used in the first phase of the auto-discovery process to discover Internet services and relationships among them. However, other mechanisms are used in this first phase to supplement the information acquired from the domain name system.

A second phase of the auto-discovery process uses software agents that are executed within the ISP system and that take an internal viewpoint of the ISP system. Whereas the first phase of discovery identifies most of the execution, component and organization dependencies, as well as some of the inter-service dependencies, the internal discovery of the second phase is focused on determining the inter-service dependencies. The definitions of these dependencies will be set forth immediately below. There are two basic approaches to the internal discovery of the second phase. One approach is the use of network probes, which are implemented in software and are installed at strategic locations on the network to acquire information from headers of packet transmissions. By processing the headers of packets, a software probe can deduce many of the relationships that exist among servers. The second basic approach is to use special-purpose discovery agents that are installed on the ISP hosts to discover relationships among services. Rather than examining headers of packet transmissions, the special-purpose agents use a number of operating systems and application-specific mechanisms (such as processing service configuration information and application-independent monitoring tools) to discover inter-service dependencies before forming the auto-discovered instance 36 of FIG. 2.

As noted immediately above, there are a number of interdependencies of concern to forming the auto-discovered instance 36. These inter-dependencies include execution dependencies, component dependencies, inter-service dependencies, and organizational dependencies. An execution dependency relates directly to an application server process being executed on a host machine. The types of application servers that are executed on host machines include web, email, news, DNS, and NFS. A component dependency occurs in order to ensure scalability and redundancy of a service. For example, a web service may be provided collectively by a number of "front-end servers" (FESs), with round-robin DNS scheduling being used to provide subscribers with a domain name that maps to one of the FESs. ISPs often replicate web, email, and News content across a number of servers. The round-robin scheduling balances the load among the servers. The servers are grouped together and assigned a single domain name in the DNS database. When the DNS server receives a request for the domain name, the IP address of one of the servers is acquired in the round-robin scheme.

An inter-service dependency occurs when one service accesses another service for its proper operation. For example, a web service depends on a DNS service to allow the subscriber to connect the web server host using its IP address, and an NFS service is used to access the web content. As another example, a Read Mail service depends on an authentication service to verify the identity of the subscriber, uses a DNS service to log the subscriber's IP address, and uses an NFS service to access the mail content.

Finally, an organizational dependency occurs when there are different ISP operations personnel (e.g., subject matter experts) who are responsible for different services and service components. For example, an ISP may have a first supervisor managing the web service, a second supervisor managing DNS, and a third supervisor managing NFS. Operational responsibilities may also be delegated based upon the geographical location of the service components. Since the precise organizational structure may vary from one ISP to another, the auto-discovery mechanism provides a means by which it can be quickly customized for a particular ISP system in order to generate the auto-discovered instance 36 of FIG. 2.

The service model creation engine 38 of FIG. 2 is used to generate a service model instance 40 based on the service model template 34 and auto-discovered instance 36. Ideally, all of the discovered information is available prior to instantiation. However, in many cases, discovery has to be performed in multiple phases, such as the two outlined above. In such cases, instantiation may occur partially after each phase of discovery. The main advantage of providing a partial service model instance is that the partially completed service model can provide a guide to identify the additional information needed in subsequent phases of discovery. Since new elements and services may be added to the ISP system over time, the service model instantiation process has to be repeated periodically to augment the initially created service model instance.

Unlike the service model template 34, the service model instance 40 is specific to an, ISP system. The process of constructing the service model instance using the service model template and the auto-discovered instance 36 is referred to as the "instantiation" of the service model. As previously noted, the relationship between the service model template and the auto-discovered instance is analogous to the relationship between the schema and records in a database.

The service model instance 40 maps services and service elements that exist in a particular ISP system with nodes in the service model template. In doing so, the service model instance also specifies a set of measurements that must be made against each of the services and service elements in the specific ISP system.

The service model instance 40 may be used by a view generator 42. In the preferred embodiment, the service model instance is represented as a graph of the nodes and edges that identify dependencies of the nodes. Different management functions of an ISP will benefit from viewing different subsets of nodes and edges of the service model instance 40. Thus, the view generator 42 may be used by operations personnel to provide an "operations view" of only the services and service elements that fall in a particular domain of control of the personnel. On the other hand, a "customer support view" may provide an end-to-end view for the customer support personnel of the ISP. A "planning view" may be used to graphically present information about usage and performance trends, so that future requirements can be ascertained.

Even when different management functions are interested in the same subset of nodes and edges of the service model instance 40, there may be different interests with regard to rules to be used for state computations. For instances, a management application that visually depicts a color-coded hierarchical representation of the service model instance to operations personnel may require that hierarchical state propagation rules be employed in the service model instance. In this manner, viewing the state of the top-level nodes of the service model, an ISP operator can determine whether any problem has been detected in the ISP system. In contrast, an application that is responsible for automatically detecting, diagnosing and reporting the root-causes of problems in the ISP system may prefer not to use a hierarchical state propagation rule, since it is interested in the state of each node of At the service model independently of the state of other nodes.

The view generator 42 may be used to define the subset of nodes of a service model instance that are of interest to a management application, as well as the method for evaluating the states of the nodes of interest. The measurements that are associated with the nodes in the service model instance are common across the different views. However, the rules that apply to computing the state of a particular node based upon relevant measurements and the states of dependent nodes may be different for the different views. The view generator 42 may expose a graphical user interface that a user can employ to customize the views provided to the user.

A measurement agent configurator 44 may be used to extract information from the service model instance 40, when the information is relevant to scheduling tests and retrieving test results. At the completion of the service model instance 40, static configuration information as to how the tests of various elements are to be run may be merged with default algorithm descriptions into a service model instance file. State computation rules, thresholds and alarm correlation rules defaults may be overridden using the measurement agent configurator. Specific measurements may be enabled or disabled. A final measurement agent specification 46 is generated by the configurator for the specific ISP. The measurements that are identified in the specification 46 are executed using software agents 45. The results of the measurements are analyzed and used by a service model manager 47 to compute the states of different nodes in the service model.

Overview of Instantiation

Figure 3:
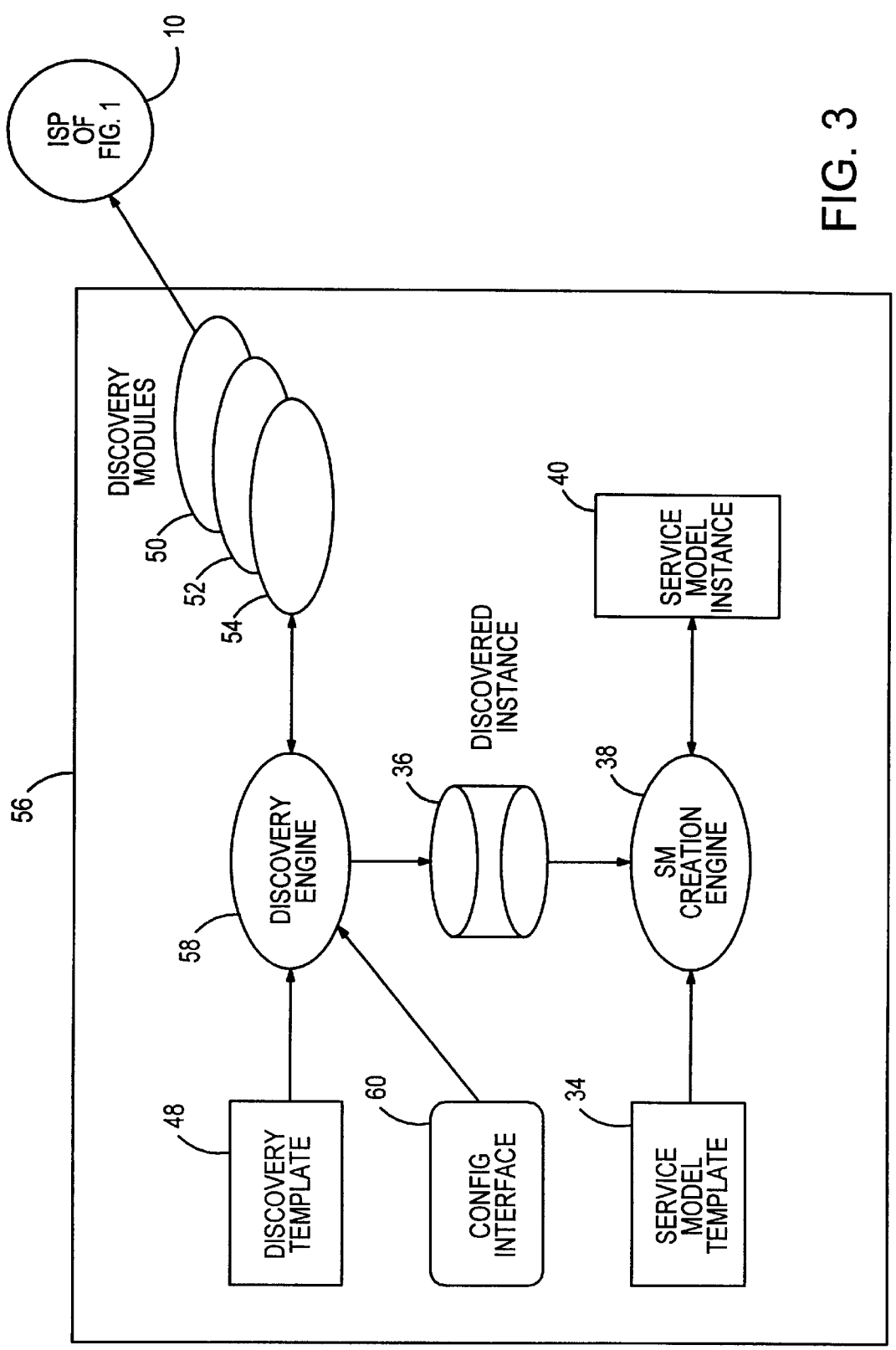
FIG. 3 is a block diagram of a management system having components of FIG. 2.

FIG. 3 represents an overview of the process for generating the discovered instance that is used to form the service model instance 40 of FIG. 2. As previously noted, a requirement of the instantiation is the generation of the service model template for the particular service of interest. The template may be handcrafted, preferably by a domain expert of the service. The template includes a specification of the elements involved in providing the service, such as servers and network links, and the dependencies of the service on other services, such as the dependency of Read Mail service on the authentication and NFS services. As will be explained more fully below, the discovery process includes designation of a discovery template 48. The discovery template specifies the types of services and the service elements to be discovered. The discovery template also includes specifications of discovery modules 50, 52 and 54 to be invoked in the discovery of the specified services and service elements.

The service model template 34, the discovery template 48, and the discovery modules 50, 52 and 54 are utilized within a management system 56 for forming the service model instance 40. Another component of the management system is a discovery engine 58 that processes information contained within the discovery template 48. The discovery engine invokes the appropriate discovery modules 50–54, interprets the outputs of the invoked modules, and stores the outputs in memory (or in a database) as the discovered instance 36, which is made accessible to the service model creation engine 38. The discovery engine 58 supports a configuration interface 60 that allows ISP operations personnel to control and customize the discovery process. Through the configuration interface 60, an ISP operator can restrict the discovery to specified IP address ranges on host name patterns. Furthermore, the operator can specify naming conventions used by the ISP (e.g., for naming terminal servers and POP sites), which are used by some of the discovery modules 50–54.

The configuration interface 60 serves as a way for an ISP operator to quickly customize the service model instance 40 that is generated by the process. Using the configuration interface, the operator can also specify categorization criteria for services and service elements. For instance, all the mail services could fall in one category, while the DNS servers could fall in another. The categories assigned to services and service elements can represent the organizational structure of the ISP, the geographical location of the servers offering the services (e.g., servers in San Francisco fall in one category, while servers in New York fall in another), or differences in business functions of the service (e.g., web servers that an ISP is hosting on behalf of business customers, as opposed to local web servers that the ISP offers for providing access to the dial-up subscribers).

In the preferred embodiment, the configuration interface 60 is implemented using a graphical user interface (GUI) at an operator computing station. An example of a configuration specification that is entered using the interface 60 is shown in Table 1.

TABLE 1

Hosts      exclude    ip    10.1.204.1–10.1.205.1
exclude all hosts with IP addresses in this range. These hosts represent subscriber
home PCs
WebServers      category name    *.com.fakeisp.net WebHost
servers with names of the form *.com.fakeisp.net are Web hosting servers
TerminalServers    extract    name    max[0–9]{3}<PopSite>
[0–9]t.fakeisp.net
Terminal servers must match the naming pattern above. Extract the POP site name
from the terminal server's name The discovery modules 50–54 obtain the configuration criteria from the discovery engine 58. The modules execute the appropriate discovery techniques, and as part of their outputs, record the categories to which the different services and service elements belong. The category information is stored at the discovery instance 36 and is interpreted by the service model creation engine 38 in a manner that is reflective of the service model template 34.

The following sections provide details regarding implementation of the process described with reference to FIGS. 2 and 3. Since the service models template 34 depends on the syntax specified in the discovery template 48, the discovery template specification is considered first. All the templates and instances presented as examples use the INI file format that is commonly used to represent the content of system files in Microsoft Windows-based personal computer systems. However, the process may be implemented using other specification and schema definition technologies (e.g., the Common Information Model specified by the Desktop Management Task Force). Per the INI format, a template or an instance is organized as different sections, each of which is specified by a unique stream enclosed within a pair of square brackets ("[<section name>]").

Discovery Template Specification

A portion of an example discovery template specification is shown in Table 2. Four sections are shown, with each section defining the discovery template for a specific service or service element. The four sections represent templates for discovery of external name servers, hosts, Mail SMTP servers, and Mail POP3 servers. The "module" variable specification in each section identifies the discovery module 50–54 of FIG. 3 that is to be used for the particular service or service element. The "arguments" variable represents arguments that are to be passed by the discovery engine 58 to the discovery module during deployment. The "outputs" variable defines the number and names of the columns in the output of the discovery module. The "instanceKey" variable denotes the index that is to be used to access the discovery instance 36 corresponding to each row of output generated by the discovery module. The name or names specified within angled brackets (< >) on the right side of the instancekey assignment must correspond to one of the column names specified in the output assignment. Finally, the "dependencies" variable indicates the dependencies that a discovery module has on other modules. The discovery engine uses this information to select a sequence in which it processes the discovery templates.

TABLE 2

[ExternalNameServers]
discovery-module=DiscoverExternalNameServers.class
discovery-arguments=–url http://ism-pc2/scripts/discEngineAPI.pl
discovery-outputs=ipAddress, hostName, domainName, category
discovery-instanceKey=<ipAddress>:DNS
discovery-dependencies=
[Hosts]
discovery-module=DiscoverHosts.class
discovery-arguments=–url http://ism-pc2/scripts/discEngineAPI.pl
discovery-outputs=ipAddress, hostName, state, category
discovery-instanceKey=<ipAddress>:Host
discovery-dependencies=ExternalNameServers
[SMTPServers]
discovery-module=DiscoverSmtpServers.class
discovery-arguments=–url http://ism-pc2/scripts/discEngineAPI.pl
discovery-outputs=ipAddress, hostName, category
discovery-instanceKey=<ipAddress>:Smtp_Mail
discovery-dependencies=Hosts,ExternalNameServers
[POP3Servers]
discovery-module=DiscoverPop3Servers.class TABLE 2-continued discovery-arguments=-url http://ism-pc2/scripts/discEngineAPI.pl
discovery-outputs=ipAddress, hostName, relatedSmtpServer, category
discovery-instanceKey=<ipAddress>:Pop3_Mail
discovery-dependencies=Hosts,ExternalNameServers There are other possible template processing policies that a discovery engine can adopt. For example, if the sections in the discovery template are ordered to reflect the dependencies among sections (e.g., a section appears in the template only after appearance of all sections on which it depends), the discovery engine 58 can proceed to process the sections of the discovery template in order. Another possibility is that the order of processing the sections in the discovery template may be determined based on the order in which sections in the service model template are processed. As will be explained below, sections in the service model template 34 have references to sections in the discovery template 48.

Discovered Instance Specification

Table 3 is a portion of an example of the discovered instance 36 of FIG. 3. Section names in the discovered instance correspond to the instanceKey variable specifications and the discovery template of Table 2. For each of the output variables in the discovery template, there is an assignment in the discovered instance of Table 3. The ISP system being discovered in this example is assumed to have the domain name fakeisp.net.

TABLE 3

[10.174.173.23:DNS]
ipAddress=10.174.173.23
hostName=dns1.fakeisp.net
domainName=fakeisp.net
category=ExternalDnsServer
[10.174.173.23:Host]
ipAddress=10.174.173.23
hostName=dns1.fakeisp.net
state=Alive
category=
[10.137.196.52:Host]
ipAddress=10.137.196.52
hostName=mailfes21.fakeisp.net:smtp.fakeisp.net
state=Alive
category=
[10.137.196.54:Host]
ipAddress=10.137.196.54
hostName=mailfes22.fakeisp.net
state=Alive
category=
[10.137.196.56:Host]
ipAddress=10.137.196.56
hostName=mailfes23,fakeisp.net
state=Alive
category=

TABLE 3-continued

[10.137.196.58:Host]
ipAddress=10.137.196.58
hostName=www.fakeisp.net
state=Alive
category=
[10.137.196.69:Host]
ipAddress=10.137.196.69
hostName=www.xyz.com.fakeisp.net
state=Alive
category=
[10.137.196.70:Host]
ipAddress=10.137.196.70
hostName=www.abc.com.fakeisp.net
state=Alive
category=
[10.137.196.52:Smtp_Mail]
ipAddress=10.137.196.52
hostName=mailfes21.fakeisp.net:smtp.fakeisp.net
category=ExternalSmtpServer
[10.137.196.52:Pop3_Mail]
ipAddress=10.137.196.52
hostName=mailfes21.fakeisp.net
relatedSmtpServer=smtp.fakeisp.net
category=
[10.137.196.54:Pop3_Mail]
ipAddress=10.17.196.54
hostName=mailfes22.fakeisp.net
relatedSmtpServer=smtp.fakeisp.net
category=
[10.137.196.56:Pop3_Mail]
ipAddress=10.137.196.56
hostName=mailfes23.fakeisp.net
relatedSmtpServer=smtp.fakeisp.net
category=

Next, a portion of a service model template specification is presented in Table 4 as an example service model template 34. The service model template contains the intelligence to map the discovered instance into the service model nodes. The discovery modules (and hence the discovered instance) are designed independently of the service model instance being generated. This enables the same discovered instance to be used in the generation of different service models (e.g., for different services). Each section in the service model template represents a type of node in the service model instance 40 and contains a series of instructions for creating a node in the service model instance. The service model creation engine 38 processes sections of the service model template, one at a time, attempting to match the template with elements in the discovered instance 36. Each element in the discovered instance corresponds to a section of the discovered instance specification. Lines beginning with a ";" represent comments. These lines are ignored by the service model creation engine 38 when it processes the service model template.

TABLE 4

[SM-Host]
; Host Node in the service model
match=[*:Host]
; for each discovered Host
instanceKey=<ipAddress>:SM-Host
measurements=TCP-Connection Rate(<ipAddress>),
       VMstat(<ipAddress>), IFstat(<ipAddress>)
; these are measurements of the host
; next copy its attributes to the SM node
hostname=<hostName>

TABLE 4-continued

```
ipAddress=<ipAddress>
state=<state>
category=<category>
[SM-Web]
; SM node for a web server
match=[*:Web]
; match all discovered Web server instances
instanceKey=<ipAddress>:SM-Web
components=<ipAddress>:SM-Host,<ipAddress>-msIP:SM-Link
measurements=HTTP-TCPConnectionTime(<ipAddress>)
; next copy all the attributes from the server discovered instance
stateComputationRule=measurementsOnly
serverType=<serverType>
hostName=<hostName>
ipAddress=<ipAddress>
category=append(<category>,<ipAdress>:SM-Host?<category>)
[SM-WebService]
; a web service node
match=[*:SM-Web]
; there is a web service node corresponding to each web server node
instanceKey=<ipAddress>:SM-WebServcie
measurements=HTTP-Availability (<ipAddress>), HTTP-TotalResponseTime(<ipAddress>),
        HTTP-DnsTime (<ipAddress>)
components=<ipAddress>:SM-Web, <<ipAddress>,Web>:SM-NFS, <<ipAddress>,
        Web>:SM-DNS
; NFS and DNS service dependencies will be determined by phase 2 discovery
category=<category>
[SM-WebServiceGroup]
match=[*:WebServiceGroup]
instanceKey=<serviceGrpName>:SM-WebServiceGroup
components=list(<serviceGrpComponentsList>) :SM-WebService
category=<category>
category=append(list(<serviceGrpComponentsList>):SM-WebService?<category>)
[SM-TopLevel-Web]
instanceKey=Web:SM-TopLevelWeb
components=*:SM-WebService, *:SM-WebServiceGroup
; components are all web services and all web service groups
[SM-DNS]
match=[*:DNS]
instanceKey=<ipAddress>:SM-DNS
components=<ipAddress>-msIP:SM-Link
measurements=DNS-Availability(<ipAddress>),
        DNS-CacheHitResponseTime(<ipAddress>)
stateComputationRule=measurementsOnly
ipAddress=<ipAddress>
hostName=<hostName>
domainName=<domainName>
category=<category>
[SM-NFS]
match=[*:NFS]
instanceKey=<ipAddress>:SM-NFS
components=<ipAddress>:SM-Host
measurements=NFS-TotalCalls(<ipAddress>), NFS-DupReqs(<ipAddress>),
        NFS-TimeoutPercent(<ipAddress>)
stateComputationRule=measurementsOnly
ipAddress=<ipAddress>
hostName=<hostName>
[SM-Pop3_Mail]
match=[*:Pop3_Mail]
instanceKey=<ipAddress>:SM-POP3_Mail
components=<ipAddress>:SM-Host
measurements=POP3-TCPConnectionTime(<ipAddress>)
hostName=<hostName>
category=<category>
relatedSmtpServer=<relatedSmtpServer>
ipAddress=<ipAddress>
[SM-ReadMailService]
match=[*:SM-Pop3_Mail]
instanceKey=<ipAddress>:SM-ReadMailService
measurements=POP3-Availability (<ipAddress>),
        POP3-TotalResponseTime(<ipAddress>),
        POP3-AuthenticationTime (<ipAddress>)
stateComputationRule=default
components=<ipAddress>SM-Pop3_Mail, <<ipAddress>,Pop3_Mail SM-NFS>,
        <<ipAddress>,Pop3_Mail:SM-Auth>
category=<category>
[SM-ReadMailServiceGroup>
match=[*:Pop3MailServiceGroup]
instanceKey=<serviceGrpName>:SM-ReadMailServiceGroup
```

TABLE 4-continued

```
components=list(<serviceGrpComponentsList>):SM-ReadMailService
category=<category>
[SM-TopLevel-ReadMail]
instanceKey=ReadMail:SM-TopLevel-ReadMail
components=*:SM-ReadMailService, *:SM-ReadMailServiceGroup
[SM-Category]
match=[*:Category]
instanceKey=<categoryName>:SM-Category
components=*SM-*?category=<categoryName>
```

Most sections of the service model template 34 begin with a "match" criteria. The match criteria for a section of the service model template specifies the discovery instances that are relevant to the section under consideration. For instance, the match criteria corresponding to the host node's specification (SM-Host) in the discovery template indicates that the corresponding discovered instances are those of type Host. The match criteria is specified as a regular expression that is matched against section names (instance keys) of the discovered instance 36. For each object (section) in the discovered instance that matches the regular expression specified in the match criteria, a corresponding node is instantiated in the service model instance 40.

Each section of the service model template 34 can match discovered instances of at least one type. When a discovered instance satisfies the match criteria specified in a section of the service model template 34, any of the attributes of the discovered instance can be referred to in the subsequent instructions of the service model template's section. The absence of a match criteria in the specification of a section of the service model template indicates that there is only one instance of that type for the particular ISP.

The instanceKey variable in Table 4 denotes the key that is to be used to refer to a service model node that is instantiated by the section of the template under consideration. The attributes enclosed within the angled brackets ("<>") must be one of the attributes of the elements of the discovered instance for which there is a reference by the match criteria.

The "components" instruction specifies the parent-child relationship in a service model instance. Various types of dependencies (i.e., execution dependencies, component dependencies, inter-service dependencies and organizational dependencies) are captured by this specification. The components list specified must make reference to the node in the service model instance 40 that is to be generated from the service model template 34. The components list refers to specific nodes, all nodes of a specific type, and all nodes of a different specific type that have a specific attribute value. Sections of the service model template that refer to leaf nodes of the service model instance do not have component specifications.

The "measurements" instruction specifies a list of measurements that must be targeted at the corresponding node in the service mode instance 40. By processing the measurement specifications of nodes in the service model instance, the measurement agent configurator 44 of FIG. 2 can determine the agents that must be scheduled for execution against each element of the discovered instance 36. It should be noted that not all nodes in the service model instance have measurement specifications.

The "StateComputationRule" instruction covers how the states of the corresponding nodes-in the service model instance 40 are computed. By default, the state of a node in the service model instance is determined based on the states of all of the measurements associated with a node and the states of all of its dependencies (children nodes) in the service model instance. The service model creation engine 38 may support additional state computation policies. For example, a "measurementsOnly" policy indicates that only the states of the measurements associated with a node must be taken into account in determining the state of that node.

Regarding attribute value settings, each service model node may derive attributes from the discovered instance 36 to which it refers. The service model template syntax also allows for hierarchical aggregation of attributes. This is demonstrated in the append construct used for defining category attributes for the service model nodes.

Service Model Creation Engine

The service model creation engine 38 incorporates the logic for processing a service model template 34 with the discovered instance 36 to generate the service model instance 40. There are alternatives with regard to the order in which the engine 38 processes the service model template. In a sequential processing approach, it is assumed that the service model template was constructed such that the sections of the service model template are in an order in which they need to be processed. The engine can then process the sections sequentially. The sequential processing enables simplification of the service model creation engine. However, this approach burdens the template developer with a requirement of manually determining the placement of each section in the template based upon the order of processing. Moreover, since processing typically starts from the host nodes, this approach may result in a number of service model host nodes that do not have additional nodes above them when a service model instance graph is generated in a manner to be described below. To avoid such "orphaned" nodes, the created service model instance must be further processed.

In the alternative hierarchical processing, a service model creation engine 38 can use the "components" specifications in the different sections of the service model template 34 to determine the order for processing the sections of the template. Since the components list specifies the dependencies of a node, before processing a section, all of the sections corresponding to each of the nodes types in the components list must be processed. Based on this rule, sections of the templates which have no specified components are processed first. Although this hierarchical approach requires more complexity than the sequential approach, it does not result in any orphaned nodes in the service model instance 40.

Service Model Instance Specification

Table 5 is an example of a portion of a service model instance specification for the service model template of Table 4 and the discovered instance of Table 3. The variables of the table are consistent with the variables of Tables 2–4. Referring now to FIG. 2, the service model instance 40 may be used by the view generator 42 to provide any of the three views. Preferably, the service model instance is represented as a graph of the nodes and edges that identify dependencies among the nodes. The service model instance is also used by the measurement agent configurator. Information from the instance may be extracted by the configurator to merge test information relevant to particular elements with default algorithm descriptions in order to generate a measurement agent specification 46 for the ISP of interest.

TABLE 5

[10.174.173.23-fakeisp.net:DNS]
ipAddress=10.174.173.23
hostName=dns1.fakeisp.net
domainName=fakeisp.net
category=ExternalDnsServer
[10.174.173.23:SM-Host]
measurements=TCP-Connection-Rate(10.174.173.23),
VMstat(10.174.173.23),
    IFstat (10.174.173.23)
ipAddress=10.174.173.23
hostName=dns1.fakeisp.net
state=Alive
category=
[10.137.196.52:SM-Host]
measurements=TCP-Connection-Rate(10.137.196.52),
VMstat(10.137.196.52),
    IFstat (10.137.196.52)
ipAddress=10.137.196.52
hostName-mailfes21.fakeisp.net
state-Alive
category=
[10.137.196.54:SM-Host]
measurements=TCP-Connection-Rate(10.137.196.54),
VMstat(10.137.196.54),
    IFstat(10.137.196.54)
ipAddress=10.137.196.54
hostName=mailfes22.fakeisp.net
state=Alive
category=
[10.137.196.56:SM-Host]
measurements=TCP-Connection-Rate(10.137.196.56),
VMstat(10.137.196.56),
IFstat(10.137.196.56)
ipAddress=10.137.196.56
hostName=mailfes23.fakeisp.net
state=Alive
category=
[10.137.196.58:SM-Host]
measurements=TCP-Connection-Rate(10.137.196.58),
VMstat(10.137.196.58),
    IFstat(10.137.196.58)
ipAddress=10.137.196.58
hostName=www.fakeisp.net
state=Alive
category=
[10.137.196.69:SM-Host]
measurements=TCP-Connection-Rate(10.137.196.69),
VMstat(10.137.196.69),
    IFstat(10.137.196.69)
ipAddress=10.137.196.69
hostName=www.xyz.com.fakeisp.net
state=Alive
category=
[10.137.196.70:SM-Host]
measurements=TCP-Connection-Rate(10.137.196.70),
VMstat(10.137.196.70),
    IFstat(10.137.196.70)
ipAddress=10.137.196.70
hostName=www.abc.com.fakeisp.net
state=Alive
category=

Customizing the Service Model to an ISP'S Organizational Structure

As previously noted, the service model instance 40 of FIG. 3 is customized to an ISP's organizational structure, so that ISP operations personnel only view the status of services and service elements that are of relevance to the personnel. A straightforward approach to customizing the service model instance to an ISP's organizational structure is to edit the service model template to explicitly include nodes that capture the organizational dependencies. For example, the nodes may be grouped according to categories (e.g., InternalWeb services and WebHosting services). Each of these categories may be managed by different operations personnel. To accommodate this case, the service model template could be modified to define nodes that represent the individual categories and dependencies that indicate the components of the different categories. Since the organizational structure varies from one ISP to another, the approach would require that each ISP edit the service model templates to match their organizational structure. Editing the service model template to define the categories and the components relationships can be a tedious task, especially for a large ISP.

An alternative approach is to allow an ISP to specify its organizational structure using the configuration interface 60 previously described with reference to FIG. 3. The service model template 34 is pre-specified to exploit the configuration specification and to generate a service model instance that is customized to each ISP. The main advantage of this approach is that the ISP operator only has to primarily edit the configuration specification, which is much less complex than editing the service model template 34.

The application of this less complex approach can be described with reference to Tables 1–5. Through the configuration interface 60, an ISP operator specifies ways in which the discovered services and service models are to be categorized in the discovered instance 36. In Table 1, the configuration specification indicates that the ISP uses the naming pattern *.com.fakeisp.net to identify web servers that are hosted for the businesses. Web servers that do not match this pattern are internal web servers that are used by the ISP's residential customers. Each of the discovery modules 50, 52 and 54 then uses the configuration specification to determine a categorization of the services and service models that are discovered. A discovery module is also included in the discovery template 48 to discover and report on all the categories that have been discovered in the ISP's system. This information is used by the service model creation engine 38 to construct a service model instance 40 that represents the ISP's organizational structure. To enable this, the service model template of Table 4 has a section that generates a node in the service model instance for each category in the discovered instance. The components list in this section maps all the services and service elements that are associated with a category to the corresponding node in the service model instance. Thus, by merely specifying the categorization of services and service elements using the configuration specification, an ISP operator can derive a service model instance that is customized for the ISP.

Example: Read Mail Service Model

Figure 4:
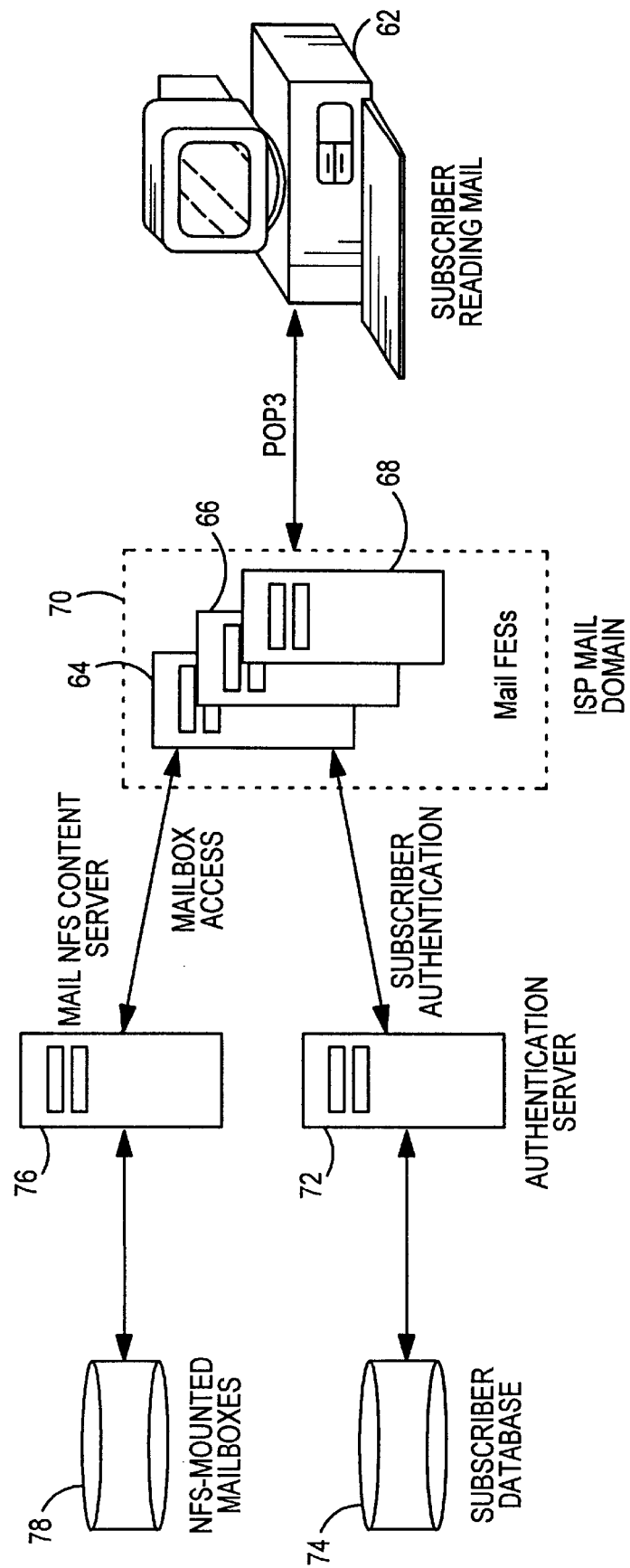
FIG. 4 is an exemplary layout of components for utilizing the Read Mail service of the ISP of FIG. 1.

As an example implementation of the system of FIG. 2, the email service of "Read Mail" will be considered. The Read Mail service refers to a subscriber accessing his/her mailbox from the mail system of the ISP. FIG. 4 illustrates a service topology for this service. Using a client application that supports the Post Office Protocol-Version 3 (POP3), a subscriber at a desktop computer 62 attempts to access mail. Internal to the ISP system, the request from the subscriber's computer 62 may be received and processed by one of many servers 64, 66 and 68 that constitute a mail service group 70. The servers within the group are front-end servers (FESs).

Before the subscriber can access the appropriate mailbox, the mail server 64–68 that handles the request contacts an authentication server 72 to verify the identity of the subscriber. Typically, password identification is used in the Read Mail service. A subscriber database 74 is accessed in this process. Following the authentication process, the mail FES 64–68 accesses a mailbox 78 of the subscriber from a back-end content server 76 using the NFS service. The retrieved mail messages are transmitted to the computer 62 of the subscriber.

There are several active and passive measurements that can be made to assess the health of the different elements involved in supporting the Read Mail service. A measurement system (MS) may be installed in the server farm of the ISP to perform measurements using agents executing on the MS and on the different ISP hosts. The different measurements that characterize the Read Mail service include an active service quality measurement of availability and response time made from the MS in the service farm, an active measurement of network throughput from the MS in the service farm to the POP sites, passive measurements of CPU and memory utilization passive measurements of TCP connection traffic and packet traffic to the mail servers obtained from agents executing on the mail servers, and passive measurements of NFS statistics (e.g., number of calls, timeouts, and duplicate transmissions) on the mail servers and the mail content servers. The active measurements attempt to assess the service quality as viewed from subscribers connecting to the POP sites, while the passive measurements may be used to assess resource utilization and traffic statistics that are critical for problem diagnosis.

Figure 5:
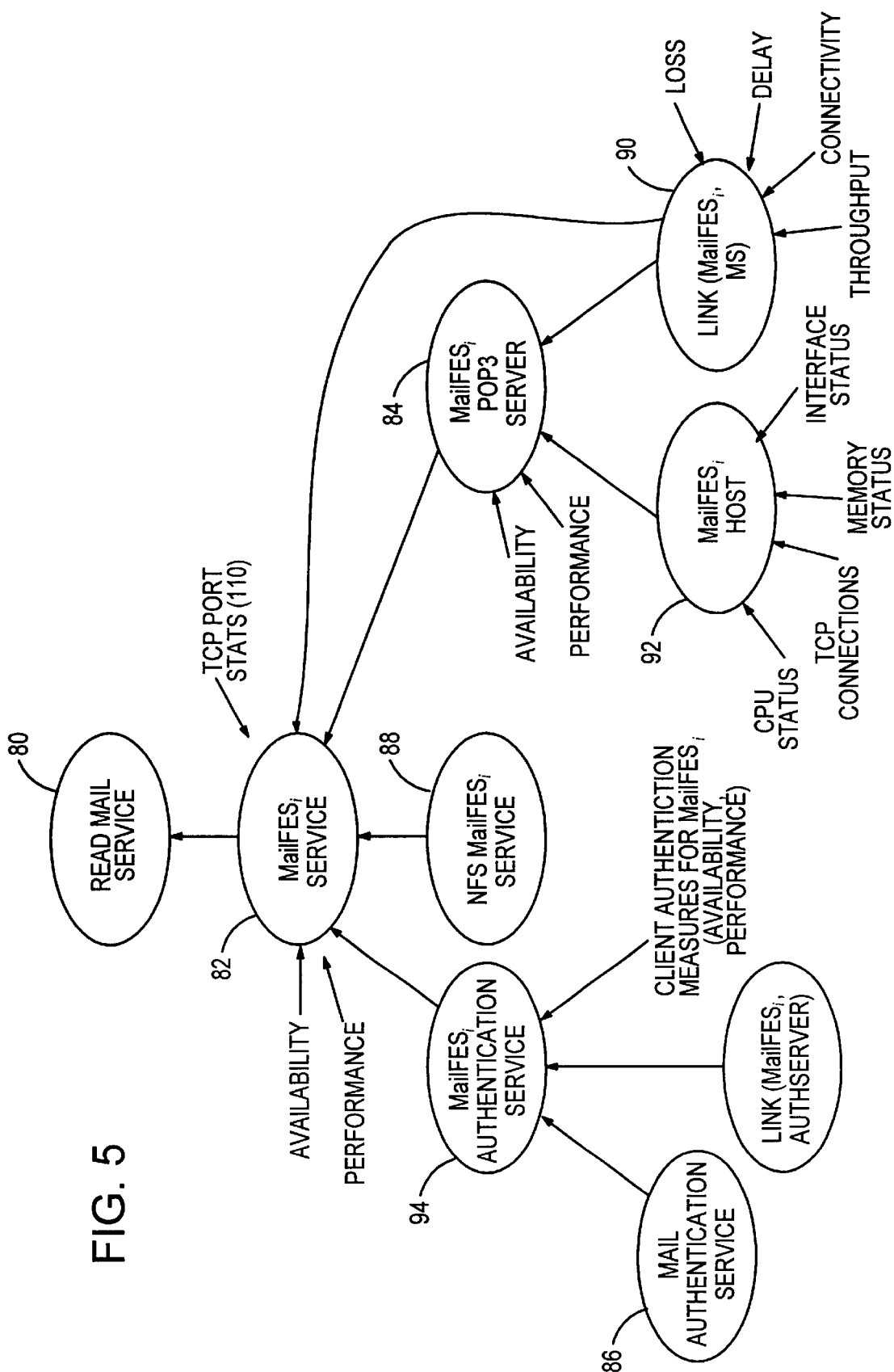
FIG. 5 is a graph of nodes of a Read Mail service model configured using the system of FIG. 2.

FIG. 5 is an illustration of an example of a view that may be presented to an ISP operator using the view generator 42 of FIG. 2. While the oval-shaped nodes in the service model graph represent the different services and service elements, the arrows represent measurements of services and service elements. The root of the service model graph is the Read Mail service, represented by oval 80. The state of this node represents the overall health of the Read Mail service, as assessed by the MS located in the service farm of the ISP. That is, the overall health is assessed without considering the state of the network links from the server farm to the POP sites. In one embodiment, the overall health is represented by color coding the oval 80. For example, oval 80 may be shaded green to designate a positive health of the Read Mail service, and may be shaded red if the Read Mail service has degraded in its availability or performance.

Typically, there is no direct measure of the overall health of the Read Mail service. Instead, the state of the service must be inferred, based on the states of the different mail FESs 64–68 that together enable the Read Mail service. Direct active measures of availability and performance, and passive measurements of TCP statistics to the POP3 service port, together contribute to the determination of the status of the Read Mail service. The active and passive measurements are performed at each of the mail FESs, as indicated by the arrows corresponding to the second level service oval 82 in FIG. 5.

The next level of the service model graph reflects the dependencies of the Read Mail service on one element and two services. Oval 84 is the dependency of the Read Mail service on a POP3 server executing on the mail FES. Oval 86 represents the authentication service for verifying the identity of the subscriber from which a Read Mail request is received. Oval 88 represents the NFS service used by the particular mail FES. Considering the POP3 server 84 first, the health of the server is measured based on the ability to establish a TCP connection as part of the active Read Mail service quality measurement and the time required to establish the connection. In turn, the health of the POP3 server may be impacted by the link, represented by oval 90, interconnecting the mail FES to the measurement station (from which the active test is run) and the health of the mail FES host, represented by oval 92. As shown in FIG. 5, both the link 90 and the host 92 include four performance parameters that are measurable in determining the health of the nodes. While not shown in FIG. 5, the state of the various nodes may be represented by color coding or by other display means for distinguishing the states of the nodes.

Regarding the dependency of the authentication service 86 on the mail service 82, since it is possible that the authentication service is healthy but a specific mail FES is failing to perform authentication, the authentication service is first represented from the point of view of each of the mail FESs 94. Direct measures of the authentication delay when accessing through a mail FES are used to determine the state of the mail authentication service 86 in relation to that mail FES 94. The service model for an authentication service node, whose state affects the state of the mail FES-specific authentication node, is not expanded in the service model graph of FIG. 5. Likewise, the NFS service 88 is not shown as being expanded in the service model graph. The service model dependency is handled in much the same way as the authentication service dependency.

Figure 6:
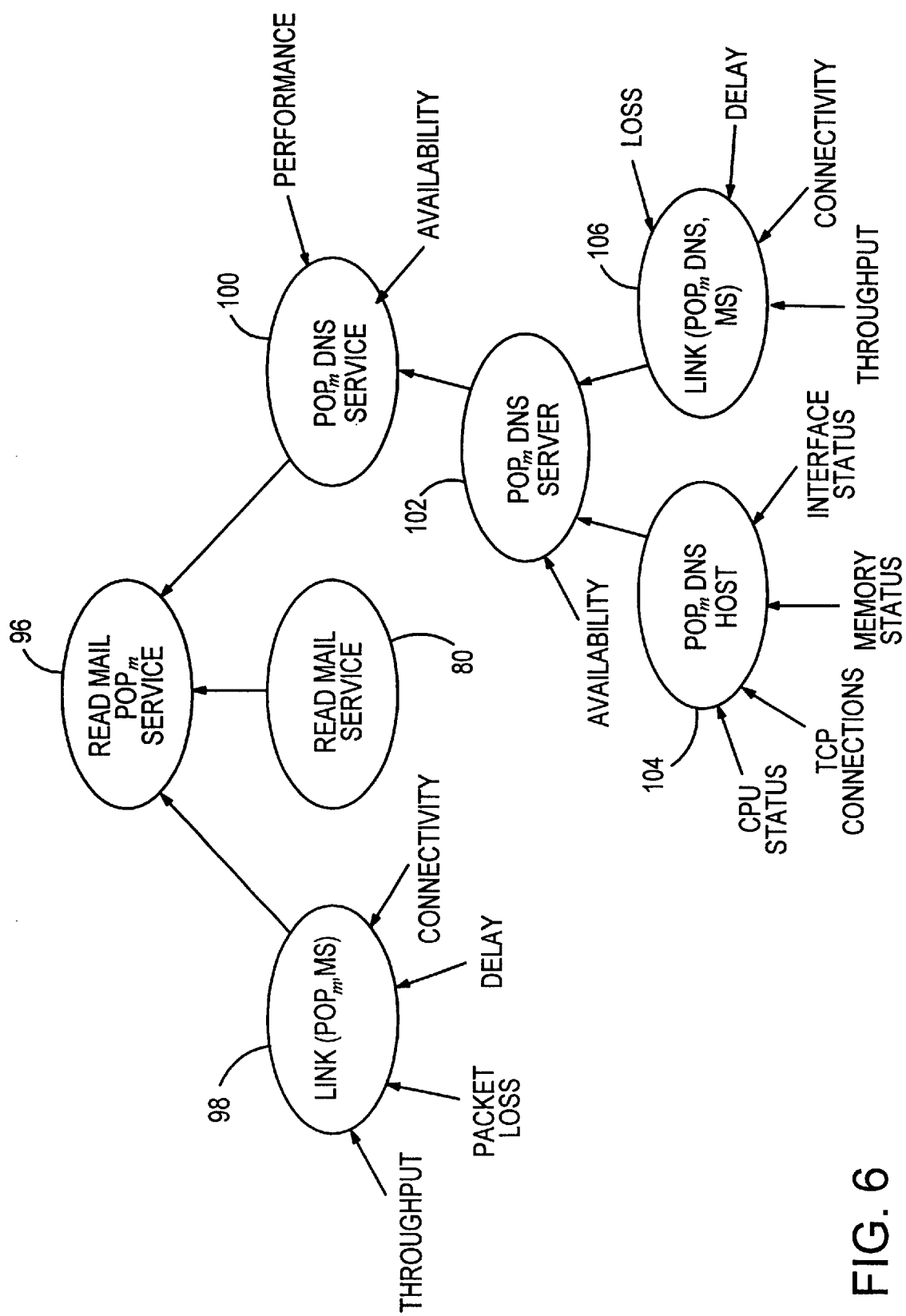
FIG. 6 is an alternative Read Mail service model graph.

As previously noted, the service model graph of FIG. 5 represents the Read Mail service in isolation. To represent the end-to-end service, a service model must take into account the state of the DNS service used by subscribers to resolve the ISP mail domain to each one of the mail FESs, and the state of the network links between the different POP sites and the ISP server farm. Clearly, since the different POP sites use different routes to connect to the service farm, a subscriber's perception of the end-to-end service may vary, depending upon the POP site that the subscriber is using. FIG. 6 is a service model graph for the Read Mail service as perceived by a subscriber connected to the ISP system via $POP_m$. The Read Mail $POP_m$ service is represented by oval 96 and has the Read Mail service 80 of FIG. 5 as one of its dependencies. However, the service 80 is not expanded. While not shown in FIG. 6, the graphing preferably includes color coding or other designation for nodes, such as the service 80, which are not fully expanded.

The other dependencies on the Read Mail $POP_m$ service 96 include the link 98 and the DNS service 100. The health of the link is determined by measurements of the performance parameters throughput, packet loss, delay and connectivity. The health of the DNS service 100 is determined by measurements of availability and performance. The DNS service 100 is shown as having the dependency $POP_m$ DNS server 102. In turn, the server 102 has two dependencies, namely $POP_m$ DNS host 104 and the link 106.

There are several ISP management functions that can exploit the capabilities of the service models. For example, a service model for operational monitoring may be configured to indicate the status of the different elements providing a service. When a failure occurs, the service model indicates which element or elements have been affected by the failure. More-over, by traversing the service model graph top-down, an operator can determine the root-cause of the failure. For example, in FIG. 5, when a problem is noticed with the overall Read Mail service 80, an operator can traverse the service model graph to determine whether the problem is caused by a specific mail FES or whether all of the mail FESs are experiencing a problem. Assuming a similar scenario, moving down the service model graph, the operator can further determine whether the problem is related to authentication failure, NFS failure, or a failure of the POP application server 84.

Since services and service elements can be organized based on domains of responsibility in a service model, ISP operations personnel need only monitor and diagnose the services that fall in their domain of responsibility. In the Read Mail service example of FIG. 4, an email operations expert who is responsible for the mail service and the mail servers uses the service model depicted in FIG. 5, since the expert is mainly interested in the states of the email services and servers. The authentication and NFS services are included in the service model representation, since these services can adversely impact the Read Mail service. In contrast, the links between the service farm and the POP sites are not included in the model, since they do not affect the Read Mail service from the perspective of the email expert.

Measurement Topology and State Representation

As can be seen in FIGS. 5 and 6, the service model maps different measurements for some of the nodes in the service model graphs. The node to which a measurement maps depends on the semantics of the measurement (i.e., which logic node or nodes are targeted by the measurement) and the location or locations from which the measurement is made. In the simplest case, each measurement directly maps to one of the nodes in the service model. In some cases, measurements may span multiple services or service elements and there may not be a direct mapping of a measurement to a node in the service model. In such cases, composite measurements, which are combinations of measurements being made in the ISP system, may have to be composed and mapped to the nodes in the service model. For example, suppose Link (x,y) is a network link interconnecting hosts x and y in an ISP system, and suppose Link (x,y) is comprised of Link (x,z) and Link (z,y). If measurements are made from x, Link (x,y) and Link (x,z) can be directly measured. The status of Link (z,y) has to be derived from the status of Link (x,y) and Link (x,z).

Each of the nodes in the service model has an instantaneous state associated with it. As previously noted, the state of a node reflects the health of the service or service element that it represents. A number of policies can be used to compute the state of service model nodes. One policy computes the state of a node based on all of its measurements. Another policy assigns weights to the different measurements based on an estimate of their reliability, as gauged by a domain expert. Yet another policy determines the state of a node based on its measurements in combination with the states of its dependencies in the service model graph. The states of the measurements associated with a node may be determined by applying baselining and thresholding techniques to the measurement results.

Discovery Methodologies

Figure 7:
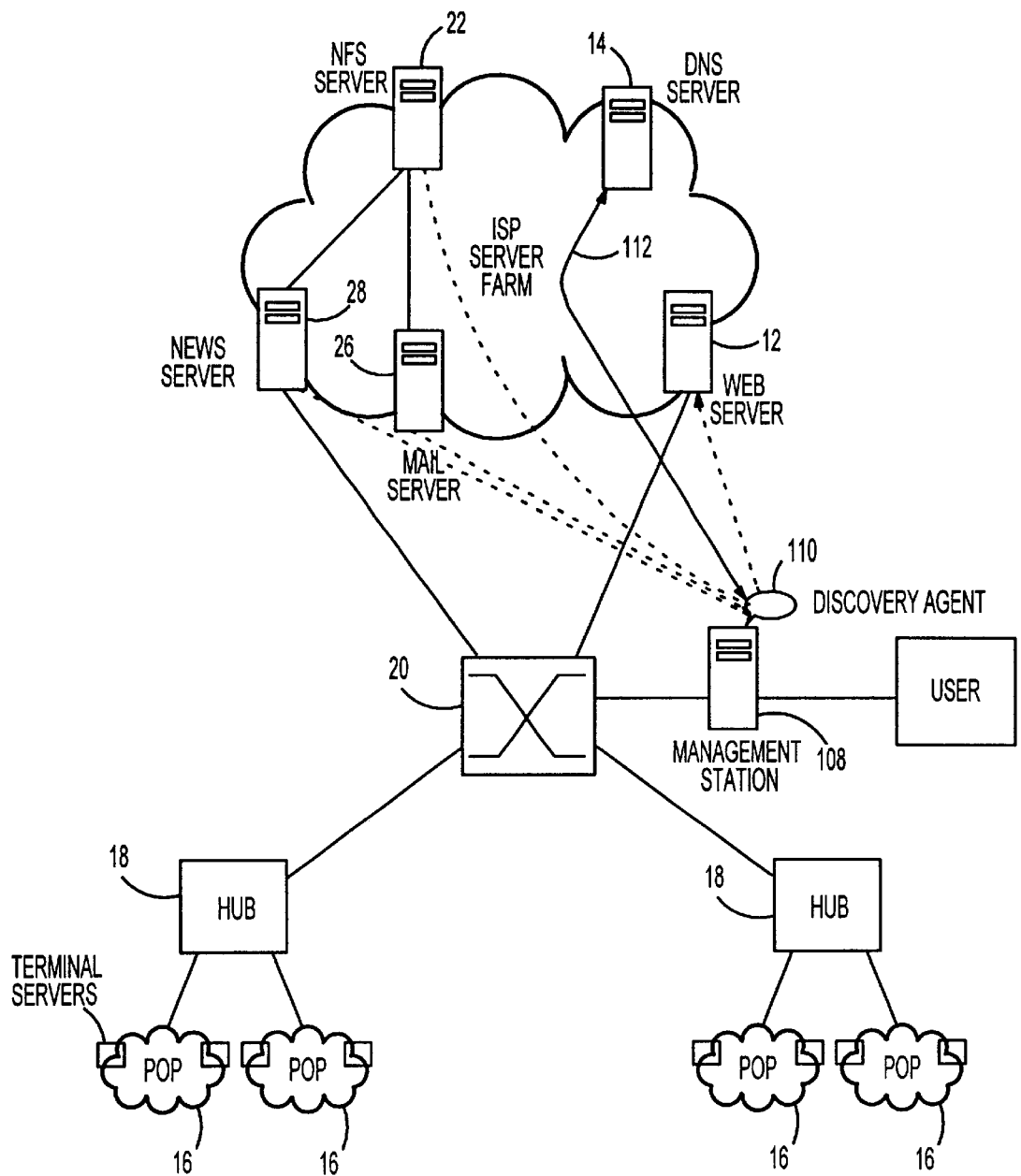
FIG. 7 is a schematic view of first phase internal discovery processing using the system of FIG. 2.
Figure 8:
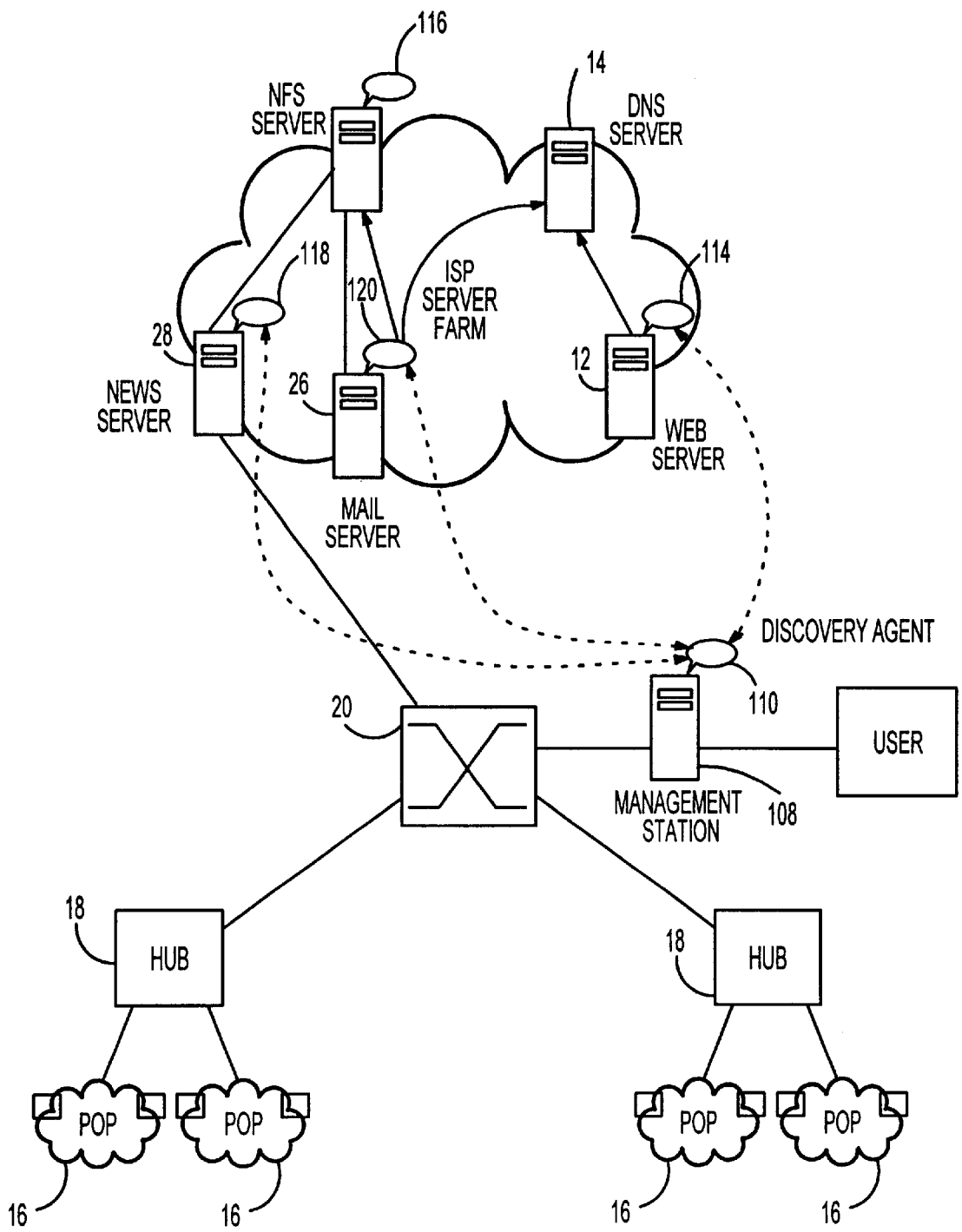
FIG. 8 is a schematic view of second phase external discovery processing using the system of FIG. 2.

Returning to FIG. 3, the preferred embodiment of the management system 56 includes a discovery engine 58 that automatically discovers services, service elements and dependencies among services and service elements. While the invention may be utilized in an environment in which the discovered instance 36 is input manually, auto-discovery is preferred. FIGS. 7 and 8 illustrate applicable discovery methodologies. Similar to existing management system implementations, a first phase of discovery is performed from a management station 108, which may be external to the service farm of the ISP system. Predominantly, this phase involves active tests that generate test traffic and query all of the ISP hosts to detect the existence of different types of servers 12, 14, 22, 26 and 28. That is, the phase detects execution dependencies, as defined above. Component and organizational dependencies are also detected during this phase. Moreover, some of the inter-service dependencies are discovered, but the second phase is focused on the inter-service dependencies, since it may not be possible to discover all the inter-service dependencies that exist using tests executed from outside the ISP host. The second phase uses an internal view of the ISP system. Preferably, the two phases are executed sequentially, with the second phase utilizing the discovered information output by the first phase to direct its operations. Different mechanisms can be employed in the internal discovery phase. Both phases of discovery must be executed periodically, so as to discover new services and service elements that may have been introduced into the ISP environment.

In FIG. 7, a single discovery agent 110 is used in the first phase external discovery process. The solid line 112 represents the discovery agent contacting the DNS server 14 to get a list of hosts in the ISP system. The dashed lines from the discovery agent 110 indicate active tests being executed by the discovery agent to detect various types of dependencies that exist.

FIG. 8 is an illustration of the second phase internal discovery process. In this phase, a number of internal discovery agents 114, 116, 118 and 120 are utilized. The solid lines having arrows at one end indicate the discovery of inter-service dependencies. The dashed lines indicate the flow of discovered instance information back to the management station 108.

Both phases of the discovery process may employ one or more different basic categories of discovery techniques. Under the service-independent techniques, hosts and networking equipment (routers 20, hubs 18, and POP sites 16) which are not specific to any service are discovered. As a second category, using service-generic techniques (which may be the same techniques, but with appropriate parameterization for each service) may be used to discover instances of different services. In order to do so, typically, such discovery techniques exploit common characteristics of different services to discover instances of the services. An example of this second category is a discovery technique for News, Web and email services. Since all of these services rely upon the same transport protocol (i.e, TCP), a discovery technique can discover the existence of application servers by connecting to the TCP ports corresponding to the services.

Another category of techniques may be referred to as the service-specific-but-application-independent techniques. Techniques in this category are specific to the service. They are intended to monitor, but may be used for discovery that is independent of the specific application server that is being used to implement the service. For example, the discovery of the relationship between the services offered by POP3 email servers and the service provided by SMTP-based email servers is possible using application-independent techniques, since the relationship is accessible from the domain name service in the form of mail exchange (MX) records.

A fourth category may be referred to as application-specific techniques. Many inter-service dependencies may need to be discovered in a manner that is very specific to the application servers providing the services. For example, to discover the dependency of the web service on NFS, the discovery technique may have to query the configuration file in the web application server that is providing the web service. Since the format and contents of a web application server's configuration file is specific to the application, the discovery technique is application-specific.

First Phase External Discovery

An often under utilized component of an ISP system is the domain name service (DNS). In order to allow subscribers to access hosts using their host names, rather than their more difficult to remember IP addresses, DNS stores the host name-to-IP address mapping for all of the hosts in the ISP system. Moreover, the exchange of email messages across hosts occurs using the mail exchange records maintained by the DNS. Name server (NS) records in the DNS database serve to identify authoritative name service for the ISP domain—these are name servers that are externally accessible from the global Internet and are the authorities that are contacted when users in the global Internet attempt to access any hosts in the ISP system. Moreover, service groups, such as an email service group, are enabled via round-robin scheduling mechanisms implemented in the DNS servers. In summary, the domain name system holds a wealth of information that is critical for auto-discovery of ISP services. However, additional mechanisms are necessary to complement DNS-based discovery mechanisms.

One of the first steps in discovery is to determine all of the hosts that exist in the ISP system. Most existing network management systems have taken one of two approaches. A first approach is to scan an address range that is either specified by an operator or is determined based on the local subnet of the measurement host. The address range is scanned using ping to solicit responses from all IP-enabled hosts. The second approach is to use the default router configured for a host to boot-strap the discovery. Communication using SNMP with the router and using its routing tables may be used to discover hosts in the local subnet. Also, routing table information may be used to discover other routers that can provide additional host information.

An alternative approach that is complementary to either of the two traditional approaches is to obtain a list of all of the hosts in the ISP system using information available with the domain name service. From the host name of the management station in which the discovery process executes, the ISP domain name can be deduced. Using the default name service configured for the management system, the discovery process queries DNS to obtain the NS records that list the authoritative name servers for the ISP domain. One or more of these name servers are contacted by the discovery process to obtain a list of named hosts in the ISP system. Zone transfer capabilities supported by all DNS servers are used for this purpose, as is known in the art. While ISPs usually manage a single domain, some ISPs may have multiple domains under their control. To discover all of the hosts that exist in the different domains, the discovery process must be informed of the existence of all the different domain names. This information cannot be automatically deduced by the discovery process.

Figure 9:
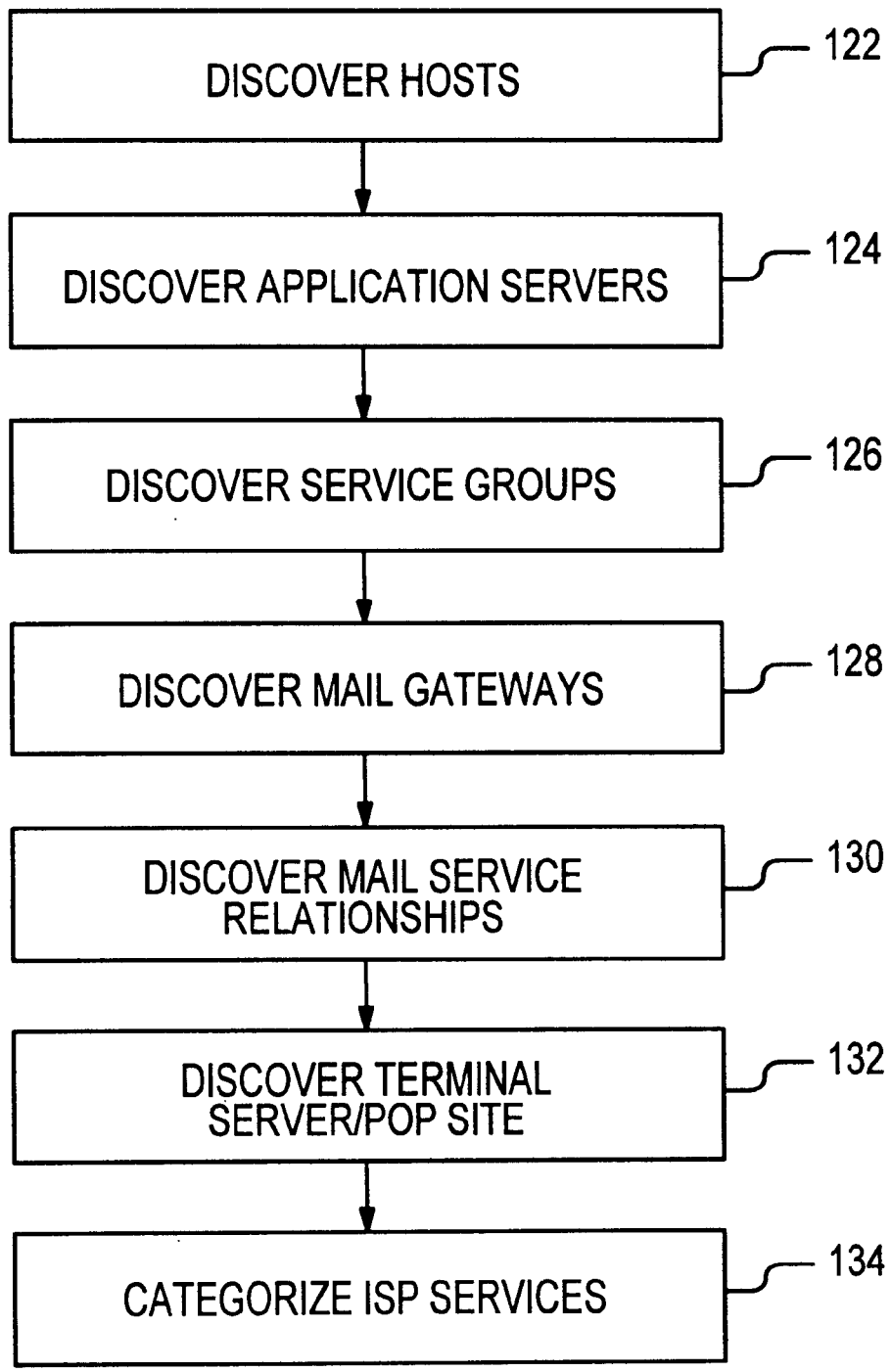
FIG. 9 is a process flow of steps of the first phase discovery of FIG. 7.

The steps that are executed in the first phase of discovery are identified in FIG. 9. It is not critical that the steps be followed in the order shown in the figure. Following the step 122 of discovering the hosts, the application servers are discovered in step 124. The existence of application servers of different types (e.g., Web, email, News, FTP, DNS, NFS, and Radius) is verified by active tests that emulate typical client requests directed at the different TCP and UDP ports corresponding to the different service types. A response to an emulated request has to be interpreted in a service-specific manner. By observing the header in a response from the web service, the discovery process determines the type of web server that is executing on the host machine. Likewise, by processing the response returned by the email and News servers, the discovery process determines the type of servers. This information can be used to customize the second phase of discovery. For instance, discovery agents installed on the ISP host machines in the second phase of discovery may process a web application server's configuration files to discover NFS dependencies that the server may have. Since web server configuration files are typically specific to the type of server, the server type information provided by the first phase of discovery can be used to determine the processing capabilities of the discovery agent or agents that must be deployed in the second phase. The server type information may also be used to determine specific measurements which must be targeted for the server to monitor its status.

In step 126, the existence of Web, email, News, DNS and other service groups has to be determined using the DNS. By querying the DNS, the discovery process determines a list of domain names that have multiple IP addresses associated with them. For each name in the list, the discovery process then determines whether each of its IP addresses hosts a common application server. If so, the name likely represents a DNS round-robin service group that supports a common service. For example, suppose that all of the IP addresses corresponding to the name www.fakeisp.net host web servers. In this case, www.fakeisp.net represents a web service group. Note that in this process, a host that has two network interfaces, and therefore is assigned to different IP addresses, may be listed as a service group. Using the virtual host/server discovery heuristics discussed below, all such hosts can be removed from the service group list.

In step 128, the MX records for the ISP domain are accessed from the DNS system. The MX records indicate the mail servers that must be contacted to deliver mail to the ISP domain. The list of SMTP-based mail servers thus determined represent the servers that handle delivery of incoming mail to the subscribers of the ISP. Discovery of these servers is essential to automatically generating a service model for the email service that represents the delivery of mail from the Internet to the subscribers. Moreover, the mail gateways may be managed by a different entity than the one that manages mail servers that are internal to the ISP.

One of the critical measures of the performance of an email service of an ISP is the round-trip delay between the transmission of an email message from a source host and its reception at the intended destination. This measurement can be used to assess email delivery times in the ISP domain, from the ISP domain to locations on the Internet, and from locations on the Internet to the ISP domain. Since the email service uses different protocols and hence, different application servers to send mail and to receive mail, in order to initiate round-trip delay measurements of email, it is essential to determine relationships between the different types of email servers on the ISP domain (e.g., which SMTP server can be used to send mail to a POP3/IMAP-based server). This discovery is executed at step 130. Since mail forwarding is predominantly based on the MX records maintained in the DNS database, by querying the DNS system for MX records corresponding to each of the POP3/IMAP servers, the discovery process determines the mail service relationships in the ISP domain.

Various approaches can be adopted to discover the terminal servers that exist in an ISP POP site in step 132. The most straightforward approach uses SNMP queries to obtain the MIB-II system description from all the hosts in the ISP network. Based on the replies, the discovery process can identify the hosts that are terminal servers. An alternative approach is based on the observation that because they need to operate and manage thousands of terminal servers, most ISPs have specific naming conventions that they use when naming their terminal servers. In fact, the naming convention more often indicates the association between terminal servers and POP sites, so that when a problem is reported by a subscriber using a POP site, the ISP operations staff can quickly decide which of the terminal servers needs to be checked in order to diagnose the problem. With this approach, an ISP provides a regular expression representing the naming convention used as input to the discovery process. By matching the list of hosts that are discovered with the naming convention, the discovery process not only determines the terminal servers that exist, but also determines the POP site to which a terminal server is assigned. Another key advantage of this approach is that it performs discovery without generating any additional network traffic.

The approach of exploiting name conventions may also be used in step 134 to categorize the other services of the ISP. As an example, for each web site that it hosts for its business customers, a particular ISP may assign internal names of the form *.com.fakeisp.net, so that a hosted web site named www.customer-domain.com will have a corresponding entry for www.customer-domain.com.fakeisp.net in the internal DNS database of the ISP. As in the case of terminal servers, by permitting an ISP to specify its naming conventions, the discovery process composes a categorization of services that is customized to the target ISP system. This categorization can be based on geographical locations of services, based on business relationships, and/or based on the delegation of responsibilities among operators. The categorization information can be used to automatically define the customized service model for each ISP, with special nodes in the service model representing a collection of nodes pertaining to the same category.

Second Phase Internal Discovery

By treating the ISP system as a "black box," the first phase of external discovery detects most of the execution, component and organizational dependencies of the ISP. Additionally, some of the inter-service dependencies are discovered. The internal discovery process is focused solely on detecting inter-service dependencies, particularly those that are not discovered by taking an external viewpoint. For example, the relationship between a mail server and an NFS server is not discoverable from an external viewpoint.

There are two basic approaches for conducting the internal discovery. One approach uses network probes, while the other approach uses special-purpose discovery agents. Regarding the first approach, soft-ware probes installed at strategic locations on the network can snoop on packet transmissions. Since most TCP/IP communication is based on source/destiny port numbers, by processing the headers of packets that are captured by the probe, a software probe can deduce many of the relationships that exist among services. For example, a UDP packet transmitted from a mail server to the NFS port of an NFS server indicates that the mail server depends on the NFS server for its content storage.

An advantage of the approach that utilizes network probes is that the approach enables discovery of inter-service dependencies independent of the specific types of application servers residing on the host. Moreover, since it relies on just the ability to capture packets on the wire, this approach handles UDP and TCP-based services equally well.

The key difference between the approach of using network probes and the approach of using special-purpose discovery agents is that unlike the network probes, the discovery agents do not snoop on packet transmissions. Instead, the discovery agents use a number of operating systems and application-specific mechanisms to discover inter-service dependencies. These mechanisms include (1) processing service configuration information and (2) application-dependent monitoring tools. Referring first to the processing service configuration information, application servers determine their dependencies on other services from one or more configuration files. By processing the content of the configuration files, discovery agents can discover inter-service dependencies. An example of this is the processing of the web server's configuration file to discover whether it has a dependency on an NFS service. While processing the web server's configuration file, the discovery agent can also determine if the same application is being used to host multiple "virtual" servers (which is commonly used by ISPs to host web sites on behalf of their business customers). Typically, web server configuration files are specific to the type of server executed on the web server in use. The server type determination performed during external discovery (i.e., the first phase of discovery) is used for deciding the location and format of the configuration files.

While many Unix operating systems use configuration files that are defined in an application-specific manner, Windows NT-based systems store all application configuration information in the registry. In the Windows NT systems, while the registry can be processed in an application-independent manner, the specific configuration attributes have to be interpreted in an application-specific manner.

Thus far, only forward-looking discovery agents have been identified. These are agents that discover dependencies of a service on other services by querying configuration files of the application providing the service. Sometimes it is easier to implement backward-looking discovery agents to discover the dependencies on a service (i.e., discover which other services are using the service). For example, the configuration file of the mail authentication server may indicate which of the mail servers are depending on the authentication server. One of the ways of implementing backward-looking discovery agents is by processing application server configuration files.

Turning now to the second mechanism of using application-independent monitoring tools, this approach is particularly attractive for services that communicate using TCP. The netstat utility can be used to determine the TCP connections that exist on an ISP host. A discovery agent that executes this tool can periodically discover information about the source and destination ports and the host locations for TCP connections, which can then be used to deduce inter-service dependencies.

This second approach of using application-independent monitoring tools exploits the fact that most TCP implementations enforce a three-minute delay for connections in the TIME_WAIT state of TCP, so that a connection persists for about three minutes even after it is no longer in use. Consequently, whenever the discovery agent is executed, it is likely to detect all the TCP connections that may have been established in the three minutes prior its execution.

This same approach does not work for UDP-based services, since UDP is connectionless, and there is no state that is maintained at either the source or the destination.

The approach of monitoring TCP connections can be used to discover dependencies such as those that exist between mail servers and mail authentication servers, between servers and back-end databases, between Radius/TACACS authentication servers and terminal servers, and between similar relationships. Again, discovery agents can be forward-looking or backward-looking.

Advantages of using discovery agents, as compared to network probes, include the reduction of overhead on the ISP hosts, the relaxation of security concerns, and the fact that all of the discovery agents do not need to be deployed at the same time. Instead, the deployment of discovery agents can occur at the discretion of the ISP. As and when new discovery agents are installed on the ISP hosts, additional information is discovered about the ISP system.

Figure 10:
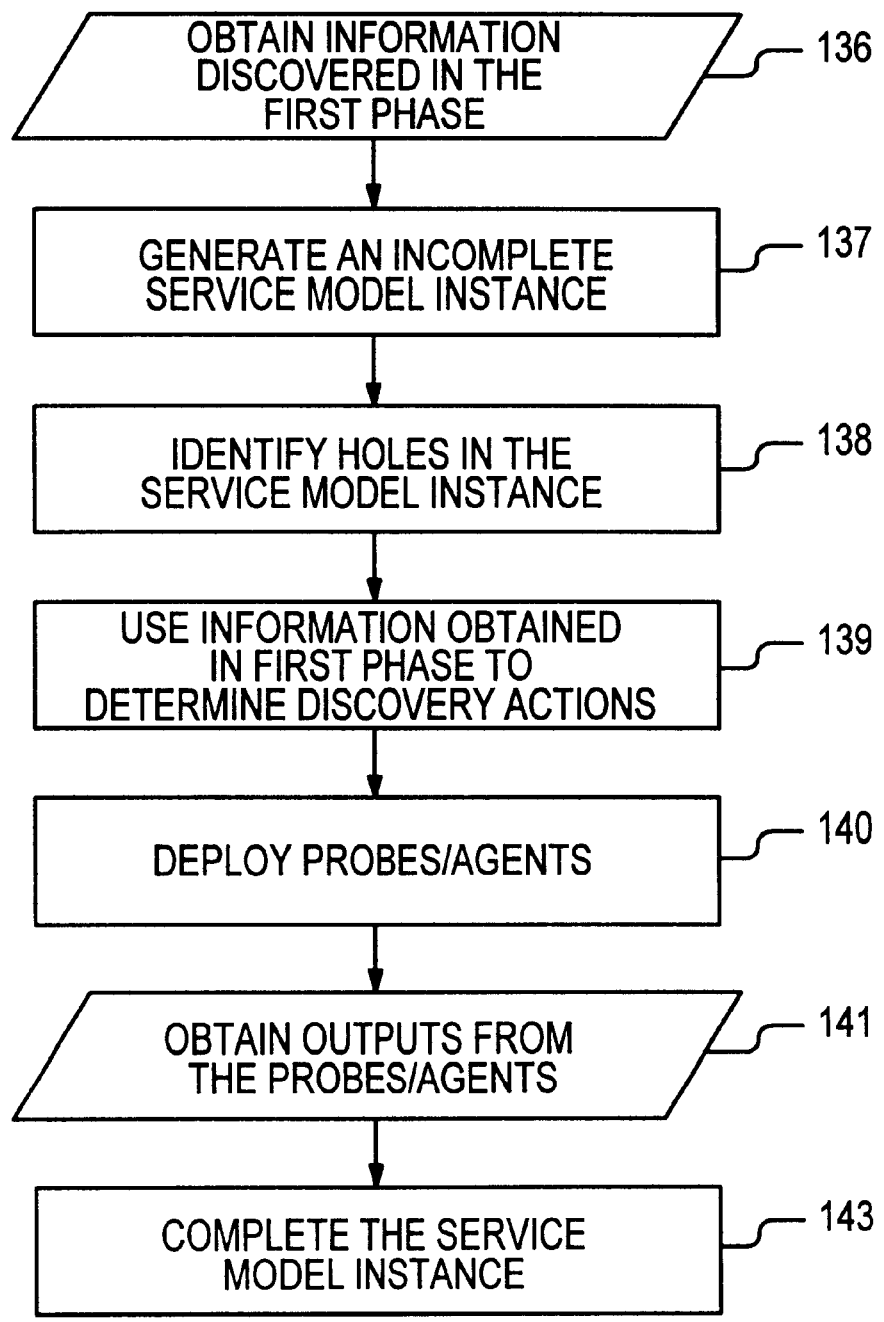
FIG. 10 is a process flow of steps of the second phase discovery of FIG. 8.

FIG. 10 is a process flow of steps relevant to the second phase of the discovery process. In steps 136 and 137, the information that is obtained in the first phase of discovery is used to generate an incomplete service model instance. As previously noted, the first phase of discovery provides the necessary information for identifying component dependencies, organizational dependencies, execution dependencies and some of the inter-service dependencies. A first instance generator matches the service model template with the auto-discovered information from the first phase to generate the incomplete service model instance. However, other inter-service dependencies are not discoverable using the techniques of the first phase (e.g., the relationship between a mail server and an NFS server).

In steps 138 and 139, the holes in the incomplete service model instance are identified and information obtained in the first phase is used to determine appropriate discovery actions. The incomplete service model instance is used to determine the types of relationships that must be examined. In the mail service example, if a host is discovered in the first phase to be running a POP3 server, the second phase may be used to discover the network file service and authentication service used by the POP3 server on the particular host.

In step 140, the network probes and/or the special-purpose discovery agents are deployed in a manner determined during execution of the step 139. For example, application-specific knowledge may be used to parse configuration files or log files, or may be used to search a configuration registry for a particular server instance executing on a particular host. The network probes and/or discovery agents generate service dependency outputs in step 141. The outputs are used in a second instance generation to complete the service model instance in step 143.

Extensible Discovery Architecture

Figure 11:
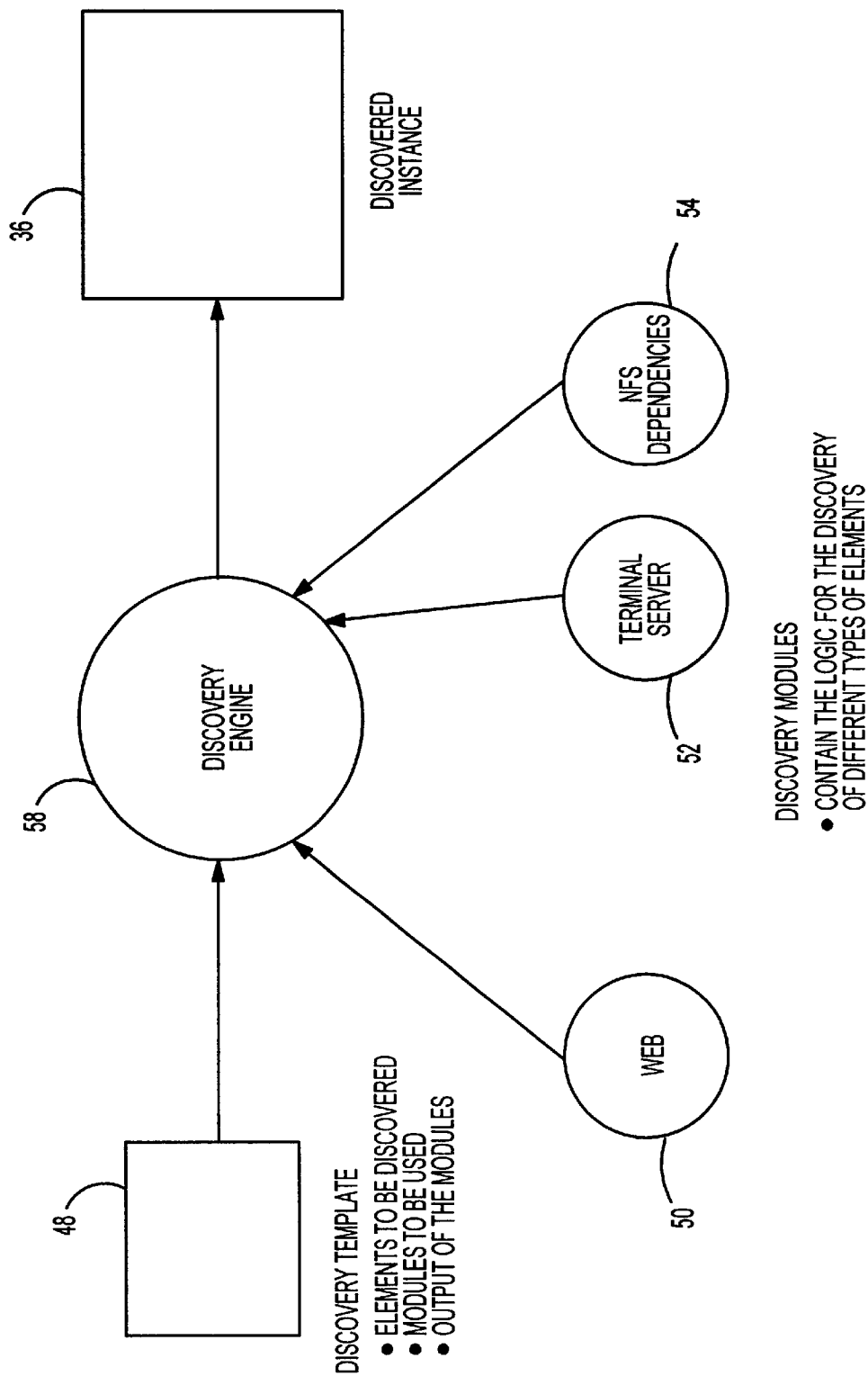
FIG. 11 is a block diagram of the operation of the discovery engine of FIG. 3.

Since new network services and service elements are being deployed at a rapid pace, it is important that the discovery methodologies be implemented in an extensible manner, allowing new discovery capabilities to be incrementally added to the management system. FIG. 11 depicts the extensible architecture for discovery components previously described with reference to FIG. 3. The discovery modules 50, 52 and 54 represent the logic used for discovery of different services and service elements. The discovery template 48 is the key to the extensibility of the auto-discovery architecture in the sense that it drives how discovery is performed. The template defines the different services and service elements that need to be discovered, and the specific discovery modules that can be used to discover these elements. The template also establishes the format of the outputs from the modules.

The discovery engine 58 drives the auto-discovery process. The discovery engine interprets the discovery template 48 and for each of the service or service element types specified in the template, the engine invokes the corresponding discovery module 50, 52 and 54 specified in the template. All of the discovery modules report the results of their execution back to the discovery engine. The discovery template contains instructions for the discovery engine to process the output of the discovery modules and to record them as a discovered instance 36.

Some discovery modules may rely on the discovery results of other discovery modules. For example, a DNS round-robin service group discovery module for web services relies on identifying which hosts support web services, which is an output of the web service discovery module 50. To accommodate these relationships, as part of the interface that the discovery engine 58 exposes to the discovery modules, the engine provides ways for accessing and searching the instances discovered by other discovery modules.

In contrast to the discovery modules 50, 52 and 54, the discovery engine 58 is designed to be independent of the services that need to be discovered. Consequently, to discover new services or service elements, a user merely has to provide a discovery template specification or one or more discovery modules for each new element. By providing an alternate discovery module for a service that is already supported, a user can also enhance capabilities of an existing discovery system.

In practice, there are two significantly different approaches to designing the discovery engine 58 and the discovery modules 50–54. A first approach is to enable the discovery engine to control the discovery process. The discovery engine accesses the discovery template and determines the order in which sections of the template are processed. On the other hand, in the second approach, the discovery modules drive the discovery process. In effect, this is an event-driven approach, since the results obtained from one module will trigger subsequent activities by other modules.

Figure 12:
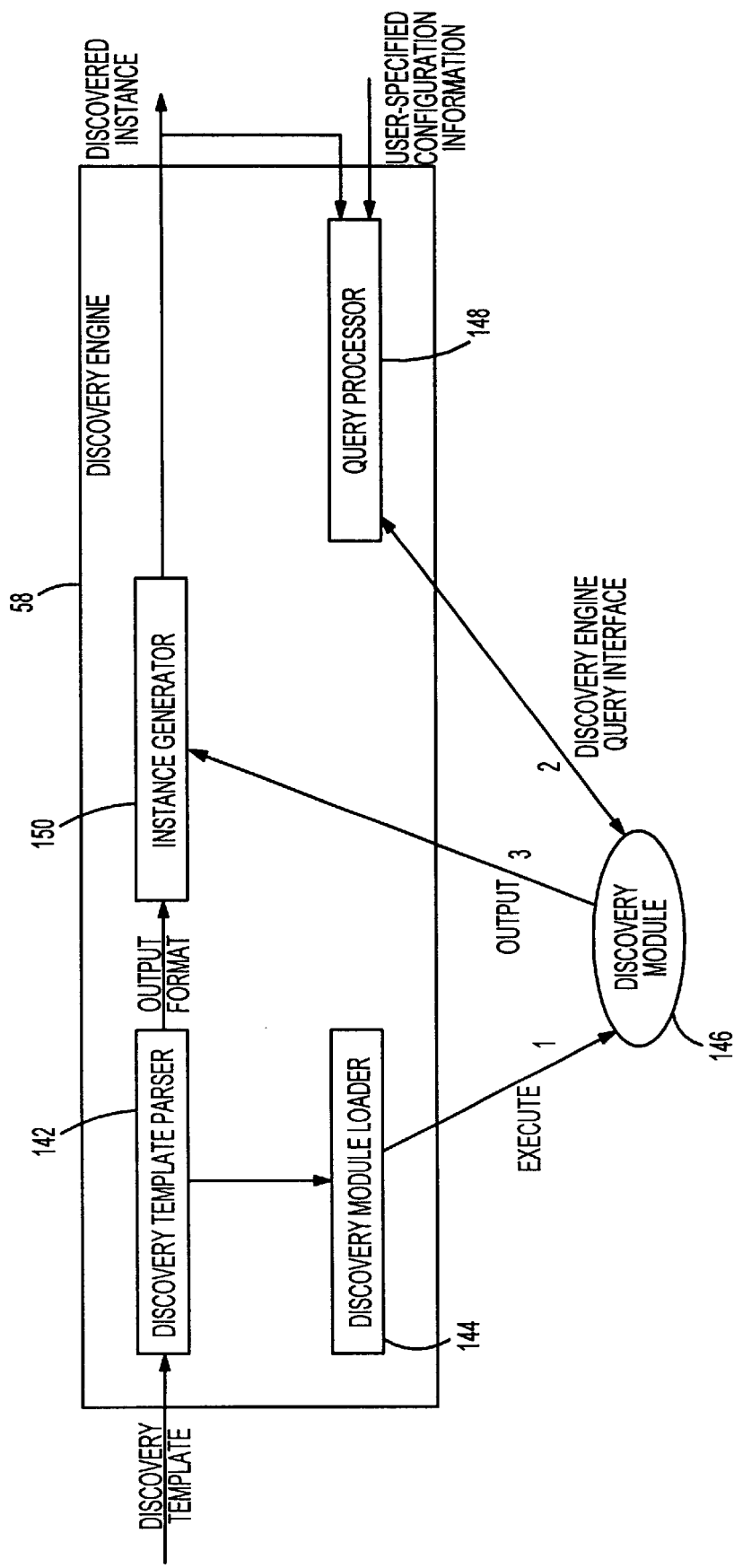
FIG. 12 is a block diagram of the discovery engine of FIG. 11.

Regarding the first approach in which the discovery process is driven by the discovery engine 58, FIG. 12 illustrates the logical building blocks of the discovery engine. The discovery engine executes periodically and each time it starts, the engine processes the discovery template.

By considering the values of the dependencies variable for each of the sections in the discovery template, the discovery engine determines the order in which the sections must be processed. Thus, the discovery engine includes a template parser 142. Sections of the template which have no dependencies are processed first. A module loader 144 directs the relevant information to the appropriate discovery module 146 for processing a particular section in which no dependencies are identified. After all such sections are processed, the discovery engine iterates through the list of template sections, choosing sections which have not been processed and which have their dependencies determined by earlier processing. This process is repeated periodically to discover new instances as and when they are added to the system being discovered. In one application, the discovery engine uses the exec system call to invoke the discovery modules as separate processes. By doing so, the discovery engine is able to handle discovery modules written in a variety programming environments.

A query processor 148 of the discovery engine 58 performs two functions. First, when a module 146 is activated, the processor 148 queries the discovery engine to obtain configuration information that guides the discovery modules. In FIG. 3, the configuration information is generated from the configuration interface 60 that is manipulable by a user. Table 1 was previously included to depict a typical configuration file. Each line in the file represents an instruction for one of the discovery modules. The first column of the line identifies the discovery module to which the instruction pertains. There are three types of instructions that are specified in the configuration file. All of these instructions specify regular expression patterns that must be applied against the IP address or host name of the service or service element. The instructions in the configuration file are (1) criteria that instruct the discovery modules to include or exclude specific services or service elements, (2) criteria that instruct the discovery modules to associate specific services or service elements with certain categories, and (3) criteria for discovering terminal servers and for extracting POP site-to-terminal server mapping from the terminal server names.

The second function of the query processor 148 is to provide the discovery modules 146 with access to previously discovered instances. Based on configuration and discovered instance information obtained from the query processor, the discovery modules perform tests on the ISP system and report their discovery output to the discovery engine. A discovery instance generator module 150 of the discovery engine processes the results of the discovery modules and outputs the discovery instance in an appropriate format. An example of such a format was previously set forth in Table 3. The formats of the discovery template and the discovery instance are thereby hidden from the discovery modules.

As previously noted, the second approach to designing the discovery engine 58 and the discovery modules 50–54 of FIG. 11 is to establish an arrangement in which the discovery process is driven by the modules. In this alternative embodiment, the discovery engine processes the template once, invoking the discovery modules simultaneously. From this point, the discovery modules determine when different elements in the ISP system are discovered. The discovery modules execute periodically, looking for new instances. Some discovery modules are independent in the sense that they are not reliant on other modules for discovery. These independent modules begin executing immediately.

As and when a discovery module 50–54 discovers a new instance, the discovery module forwards its results to the discovery engine 58. Based on the dependencies on a discovery module, as specified in the discovery template 48, the engine 58 forwards the results to other discovery modules for which the results are relevant. The availability of new results (e.g., the discovery of a new host) may trigger discovery by other modules (e.g., the web server module checks to determine if a web server is executing on the new host), and this process continues. A key advantage to this approach, as compared to the engine-driven discovery approach, is that multiple discovery modules may be executing in parallel, discovering the ISP's services. In this approach, the discovery engine 58 mainly functions as a facilitator of communication among the discovery modules. A variant of this approach may not even involve the discovery engine, with the discovery modules registering interest in other discovery modules and information concerning newly discovered instances being directly communicated among the discovery modules, without involving a discovery engine.

Integrating Discovery with Service Models

In the scenario in which the management system uses service models for management of Internet services, there are two ways in which discovery can be integrated with service models. In a looser integration, the output of discovery is integrated with a service model template that outlines the structure of a service, and the integration automatically generates a service model instance that is customized for the ISP system being managed. However, the preferred integration is one that provides a tighter integration and involves driving auto-discovery and service model instantiation from a common template. In this preferred approach, for each node in the service model, corresponding discovery template specifications are provided. The discovery and service model-specific components of the template can either be processed in a single application or can be processed separately. This approach towards tighter integration of discovery and service model templates is attractive for several reasons. Firstly, the service model template can serve to constrain the discovery process, since only services and service elements that are specified in the service model template need to be discovered. Secondly, depending upon its design, the service model template could end up using some of the outputs of the discovery process. Using a common template permits tighter syntax checking across the discovery and service model components of a template. Thirdly, the two-phase approach to discovery described above fits in well with the service model concept. The inter-service dependencies that need to be discovered in the second phase (internal discovery) can be determined based on the service model template. Finally, the discovery process itself can be determined based on the service model template specification. The discovery process may attempt to traverse the service model template tree from a root node down. At each level, it attempts to discover all services or service elements of the type specified by the node, providing all of the children of a node have been discovered. If this is not the case, the discovery process proceeds to first discover all instances of the children nodes. Continuing the tree traversal recursively, the discovery process discovers all instances that are necessary to build the service model for the ISP system being managed.

What is claimed is:

1. A method of modeling services that are available via a network comprising steps of:
   selecting a core service of interest;
   forming a service model template for said core service such that said service model template anticipates possible instances of network elements and possible instances of network services that cooperate in execution of said core service, including defining specifications relating to linking a plurality of said anticipated network elements and network services;
   discovering instance information specific to instances of actual network elements and instances of actual network services of said network; and
   generating a service model instance of said core service based upon a combination of said service model template and said instance information, including identifying dependencies among said actual network elements and actual network services.

2. The method of claim 1 wherein said step of forming said service model template includes associating measurable performance parameters with at least some of said anticipated network elements and network services, and wherein said step of discovering said instance information includes determining measurements for said measurable performance parameters.

3. The method of claim 2 wherein said step of generating said service model instance includes indicating state computation rules of said at least some actual network elements and network services based on said measurements, said state computation rules being used to compute states that are being indicative of performance conditions of said at least some anticipated network elements and network services.

4. The method of claim 1 wherein said step of generating said service model instance is executed in computer software and includes accessing at least one memory store in which said service model template and said instance information are stored.

5. The method of claim 1 wherein said step of forming said service model template includes identifying types of network elements, including servers and connectivity devices, said step of generating a service model instance including identifying operational links among said actual network elements and network services based upon information formed within said service model template.

6. The method of claim 1 further comprising forming a discovery template for use as a specification for executing said step of discovering instance information, said discovery template including instructions for discovering said anticipated network elements and network services.

7. The method of claim 6 wherein said step of discovering said instance information is executed in computer software and is partially based on said discovery template.

8. The method of claim 1 further comprising generating a graph of inter-connected nodes in accordance with said service model instance, each node representing one of said actual network elements and actual network services.

9. The method of claim 1 wherein said step of forming said service model template is executed with respect to availability of said core service via one of an Intranet or Internet Service Provider (ISP), said service model template being substantially generic to ISPs, said service model instance being specific to said ISP.

10. The method of claim 1 wherein said step of identifying dependencies among said actual network elements and services includes providing indications of dependencies that include inter-service dependencies, execution dependencies, component dependencies and organization dependencies.

11. A system for modeling a selected service that is available via a network comprising:

means for storing a service model template having information regarding possible instances of network elements and possible instances of services as cooperating to enable said selected service, said service model template being configured to anticipate multiple said possible instances of said network elements and services;

discovery engine means for initiating operations specific to identifying actually discovered network elements and services, said discovery engine means having an output of instance information specific to said discovered network elements and services; and model creation engine means, connected to access said service model template and said instance information, for mapping said discovered network elements and services into a framework identified in said service model template.

12. The system of claim 11 further comprising discovery modules controlled by said discovery engine means and connected to said discovered network elements for acquiring said instance information.

13. The system of claim 12 further comprising means for storing a discovery template having data specific to controlling said discovery modules, including data relating to anticipated relationships between discovery modules and network elements and services and further including data relating to relationships among discovery modules.

14. The system of claim 12 further comprising interface means, connected to said discovery engine means, for enabling user configurations of execution of said operations initiated by said discovery engine means, thereby enabling selective reconfiguration of said mapping of said discovered network elements and services.

15. The system of claim 11 wherein said model creation engine means is primarily computer software.

* * * * *